(12) United States Patent
Yamada et al.

(10) Patent No.: US 11,531,951 B2
(45) Date of Patent: Dec. 20, 2022

(54) INFORMATION PROCESSING APPARATUS

(71) Applicant: NTT DOCOMO, INC., Tokyo (JP)

(72) Inventors: Takefumi Yamada, Tokyo (JP); Ken Koumoto, Tokyo (JP); Hidetoshi Ebara, Tokyo (JP); Youhei Oono, Toyko (JP); Yuichiro Segawa, Toyko (JP); Yukiko Nakamura, Toyko (JP); Shinya Hanano, Toyko (JP)

(73) Assignee: NTT DOCOMO, INC., Tokyo (JP)

( * ) Notice: Subject to any disclaimer, the term of this patent is extended or adjusted under 35 U.S.C. 154(b) by 265 days.

(21) Appl. No.: 16/771,854

(22) PCT Filed: Jan. 22, 2019

(86) PCT No.: PCT/JP2019/001809
§ 371 (c)(1),
(2) Date: Jun. 11, 2020

(87) PCT Pub. No.: WO2019/146576
PCT Pub. Date: Aug. 1, 2019

(65) Prior Publication Data
US 2021/0073715 A1    Mar. 11, 2021

(30) Foreign Application Priority Data
Jan. 23, 2018 (JP) .............................. JP2018-009012

(51) Int. Cl.
*G06Q 10/08* (2012.01)
*B60L 50/60* (2019.01)
(Continued)

(52) U.S. Cl.
CPC ............ *G06Q 10/083* (2013.01); *B60L 50/60* (2019.02); *B60L 58/12* (2019.02); *B64C 39/024* (2013.01);
(Continued)

(58) Field of Classification Search
CPC ...... G06Q 10/083; G06Q 10/08; B60L 50/60; B60L 58/12; B60L 2200/10;
(Continued)

(56) References Cited

U.S. PATENT DOCUMENTS

2015/0069969 A1* 3/2015 Wu ........................ B60L 53/126
320/109
2018/0144302 A1* 5/2018 Murray .................... G07C 9/37
(Continued)

FOREIGN PATENT DOCUMENTS

CN       104658291    * 5/2015
JP       2016210109   * 12/2016
(Continued)

OTHER PUBLICATIONS

Notice for Reasons for Refusal issued in corresponding Japanese Patent Application No. 2019-567078, dated Oct. 12, 2021.
(Continued)

*Primary Examiner* — Muhammad Shafi
(74) *Attorney, Agent, or Firm* — Dilworth IP, LLC

(57) ABSTRACT

The location detection unit detects a destination location for delivery of an item by a drone. The release determination unit determines whether the drone transporting the item can release and place the item at the destination. Upon determination that the release and placement is not possible, a standby airspace determination unit determines a standby airspace within which the drone waits. The wait-time determination unit determines a wait-time for the drone in the determined standby airspace. The wait-time determination unit determines a wait-time by which the drone can arrive at a next destination by a scheduled arrival time following departure of the drone departs after standby. The standby instruction unit issues to the drone an instruction related to the standby.

10 Claims, 9 Drawing Sheets

(51) Int. Cl.
*B60L 58/12* (2019.01)
*G05D 1/10* (2006.01)
*B64C 39/02* (2006.01)
*B64D 1/12* (2006.01)
*B64D 27/24* (2006.01)

(52) U.S. Cl.
CPC ............... *B64D 1/12* (2013.01); *B64D 27/24* (2013.01); *G05D 1/1062* (2019.05); *B60L 2200/10* (2013.01); *B64C 2201/027* (2013.01); *B64C 2201/042* (2013.01); *B64C 2201/128* (2013.01)

(58) Field of Classification Search
CPC ............ B64C 39/024; B64C 2201/027; B64C 2201/042; B64C 2201/128; B64D 1/12; B64D 27/24; G05D 1/1062; Y02T 10/70; B64F 1/36; B65G 61/00
USPC ........................................................ 701/3
See application file for complete search history.

(56) References Cited

U.S. PATENT DOCUMENTS

| | | | | |
|---|---|---|---|---|
| 2018/0180444 | A1* | 6/2018 | Cantaloube | G08G 5/0021 |
| 2019/0019141 | A1* | 1/2019 | Torii | B64C 39/024 |
| 2019/0193855 | A1* | 6/2019 | Prager | B64C 39/024 |

FOREIGN PATENT DOCUMENTS

| | | |
|---|---|---|
| JP | 2016210109 A | 12/2016 |
| JP | 2017058937 A | 3/2017 |
| WO | 2017115446 A1 | 12/2017 |

OTHER PUBLICATIONS

International Search Report issued in corresponding PCT Application No. PCT/JP2019/001809, dated Apr. 16, 2019, 2 pages.

* cited by examiner

| ITEM ID | DRONE ID | DESTINATION | ARRIVAL TIME |
|---|---|---|---|
| H001 | D001 | ... | T1 |
| H002 | | ... | T2 |
| H003 | | ... | T3 |
| H004 | D002 | ... | T4 |
| H005 | | ... | T5 |
| H006 | | ... | T6 |
| ... | ... | ... | ... |

MARK INDICATING AVAILABLE AT ALL TIMES

MARK INDICATING AVAILABLE ONLY WHEN RECEIPIENT IS PRESENT

| ITEM ID | DRONE ID | DESTINA-TION | ARRIVAL-TIME | ATTRIBUTES (NORMAL TEMPRATURE/COLD/FROZEN) |
|---|---|---|---|---|
| H001 | D001 | ... | T1 | NORMAL TEMPRATURE |
| H002 | D001 | ... | T2 | NORMAL TEMPRATURE |
| H003 | D001 | ... | T3 | COLD |
| H004 | D002 | ... | T4 | FROZEN |
| H005 | D002 | ... | T5 | NORMAL TEMPRATURE |
| H006 | D002 | ... | T6 | COLD |
| ... | ... | ... | ... | ... |

| ITEM PROPERTY | MAXIMUM TIME REQUIRED |
|---|---|
| NORMAL TEMPRATURE | NONE |
| FROZEN | LT1 |
| COLD | LT2 |

INFORMATION PROCESSING APPARATUS

TECHNICAL FIELD

The present invention relates to a technique for transporting items by an aerial vehicle.

BACKGROUND

Known in the art are techniques for transporting items by an aerial vehicle. For example, Japanese Patent Application No. JP 2017-58937A discloses a technique whereby a destination site is marked for airborne delivery of an item, and an aerial vehicle (such as a drone) captures the marked delivery destination site and moves to the marked site for delivery of the item.

SUMMARY OF INVENTION

The disclosure of Japanese Patent Application No. JP 2017-58937A assumes that an item is transported by an aerial vehicle such as a drone. However, consideration needs to be given to a case in which delivery of an item fails due to absence of a recipient, or another circumstance. Failure to deliver an item to a recipient by way of a single flight is undesirable since a load capacity of a drone is limited, as compared to that of a truck, for example.

It is therefore an object of the present invention to reduce instances of return of an aerial vehicle due to failure to deliver an item, and to avoid impeding delivery of other items by the aerial vehicle.

To achieve the above-stated object, the present invention provides an information processing apparatus including: a judging unit that is configured to determine whether an aerial vehicle carrying an item can release the carried item at a destination; and a determination unit configured to determine a wait-time length for the aerial vehicle within a predetermined airspace at the destination when it is determined that the aerial vehicle is not able to release the carried item.

Further, the determination unit may determine the wait-time length such that the aerial vehicle following departure after completing the wait-time length can arrive at a next destination by an arrival time set for the next destination.

Further, in a case that the aerial vehicle is scheduled to fly to a plurality of destinations and an alternative aerial vehicle is substituted for the aerial vehicle for transport to at least one destination, the determination unit may determine the wait-time length such that the substituted aerial vehicle following departure after completion of the wait-time length can arrive at a next destination by an arrival time set for the next destination selected from among a plurality of destinations except for the at least one destination.

The aerial vehicle may include a battery for power storage; and the determination unit may determine that a remaining amount of power stored in the battery is insufficient for the aerial vehicle to complete the wait-time length and following departure fly to a location for recharge of the battery.

Further, the determination unit may determine a required wait-time for the recharge of the battery at the recharge location.

The information processing apparatus may additionally include a weather acquisition unit configured to acquire weather information on a flight area of the aerial flight vehicle and upon forecast of a predetermined weather event by the weather acquisition unit the determination unit determines the wait-time length after completion of which the aerial vehicle is able to return.

Further, when an upper limit of a transport time is provided in correspondence with an attribute of the item carried by the aerial vehicle, the determination unit determines the wait-time length for completion of transport of the item and departure of the aerial vehicle prior to elapse of the upper limit of the transport time.

Further, there may be provided a pattern acquisition unit configured to acquire information representative of a lifestyle pattern of a recipient of the item, wherein the determination unit determines the wait-time length as a time that is equal to or less than a threshold value during which the recipient can receive the item, the time being indicated by the acquired information representative of the lifestyle pattern.

Still further, there may be provided a pattern acquisition unit configured to acquire information representative of a lifestyle pattern of a recipient of the item, wherein the determination unit determines the wait-time length as a time that is equal to or less than a threshold value during which the recipient can receive the item, the time being indicated by the acquired information representative of the lifestyle pattern.

Still further, there may be provided a location detection unit configured to detect a wait location at which the aerial vehicle can land and wait, wherein upon detection of the wait location, the determination unit determines a wait-time length that is longer than that when a wait location is not detected.

According to the present invention, it is possible to reduce instances of return of an aerial vehicle resulting from failure to deliver an item without affecting other deliveries performed by the aerial vehicle.

DETAILED DESCRIPTION

1. Embodiment

Figure 1:
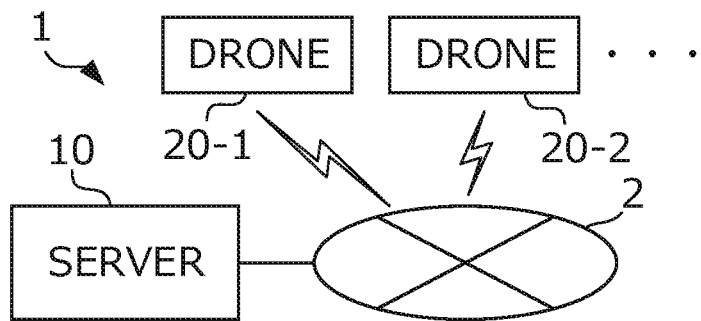
FIG. 1 is a diagram illustrating an overall configuration of a transport management system according to an embodiment of the present invention.

FIG. 1 shows an overall configuration of a transport management system 1 according to an example. The transport management system 1 is a system for managing transport of an item using a drone. The drone is an unmanned vehicle capable of autonomous flight to a destination (for example, for delivery of an item). In the present invention, an example of "an aerial vehicle" is a drone. The item may be a product purchased by a recipient or the item may be sent from one person to the recipient as a gift or the like, or the item may be owned by the sender, as in a case of baggage owned by the sender, or the like.

The transport management system 1 includes a network 2, server 10, and drones 20-1, 20-2, . . . (hereafter, referred to as "drones 20" unless otherwise specified). The network 2 is a communication system, and includes a mobile communication network and the Internet for exchange of data between devices that access the system. The server 10 accesses the network 2 either by wired or wireless communication, while the drone 20 uses wireless communication for access.

The server 10 executes various processes for managing transport of items by the drone 20. For example, the server 10 performs a process of instructing the drone 20 that is carrying an item to start transport by notifying a delivery destination and an arrival time; a process of instructing the drone 20 that has arrived at the delivery destination to release the carried item; and a process of instructing a recipient of the item to wait at the destination for a predetermined period of time in a case that the recipient is unable to immediately take delivery of the item due to absence of the recipient, or the like.

In the present embodiment, Drone 20 is a rotorcraft type of aerial vehicle that includes one or more rotor blades, and flies under rotation of the rotor blades. The drone 20 has a function of carrying an item and releasing the item. The drone is deployed, for example, at a distribution center where items are collected and attached to the drone 20. The drone 20 flies to a destination in accordance with an instruction from the server 10. If a recipient is available, the drone 20 delivers the item to the recipient by releasing the item.

Figure 2:
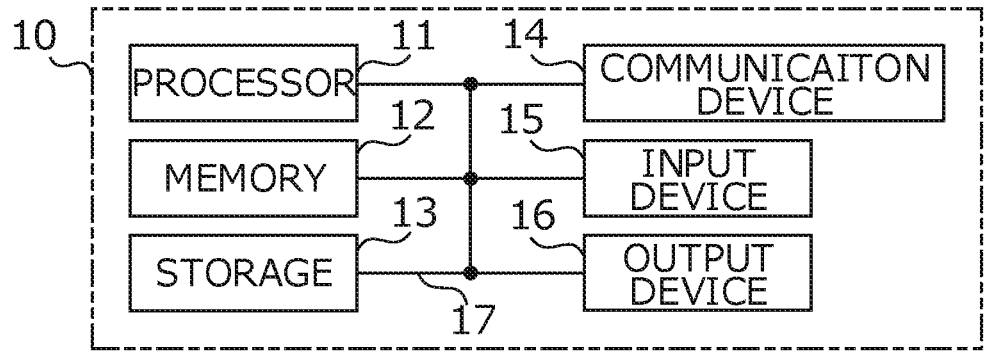
FIG. 2 is a diagram illustrating a hardware configuration of a server, in accordance to the present invention.

FIG. 2 shows a hardware configuration of the server 10. The server 10 is a computer constituting a processor 11, a memory 12, a storage 13, a communication unit 14, an input device 15, an output device 16, and a bus 17. It is of note that the term "apparatus" used herein can also be read to mean a circuit, a device, a unit, or the like. Each device may include one or a plurality of devices, or may not include some devices.

Processor 11 causes, for example, execution of an operating system to control the computer of the sever 10. The processor 11 may be constituted of a central processing unit (CPU), a variety of interfaces for peripheral devices, control units, arithmetic units, registers, and the like. The processor 11 also reads programs (program code), software modules, data, and the like from the storage 13 and/or the communication unit 14 into the memory 12 and performs various processing.

It is possible to provide one or two or more processors 11. The two or more processors 11 may perform the various processes either concurrently or sequentially. The processor 11 may also be implemented by one or more computer chips. The program may be transmitted from the network via a telecommunication line.

The memory 12 is a computer readable recording medium, which may comprise at least one of a Read Only Memory (ROM), an Erasable Programmable ROM (EPROM), an Electrically Erasable Programmable ROM (EEPROM, and a Random Access Memory (RAM). Memory 12 may be referred to as a register, a cache, a main memory (main storage device), or the like. The memory 12 is used to store the aforementioned programs (program code), software modules, data, and the like.

Storage 13 is a computer-readable recording medium and may include at least one of an optical disk, such as, for example, a hard disk drive, a flexible disk, a magneto-optical disk (e.g., compact disk, digital versatile disk, a Blu-ray (registered trademark) disk), a smart card, a flash memory (e.g., card, stick, key drive), a floppy (registered trademark) disk, a magnetic strip, and the like.

Storage 13 may also be referred to as an auxiliary storage. The storage medium described above may be, for example, a database including the memory 12 and/or the storage 13, a server, or any other suitable medium. Communication unit 14 is a hardware (a transmit/receive device) that is used for communication between a computer via wired and/or wireless networks; also referred to as network devices, network controllers, network cards, communication modules, or the like.

The input device 15 is an input device (e.g., a keyboard, a mouse, a microphone, a switch, a button, a sensor, or the like) that receives an input. The output device 16 is an output device (e.g., a display, a speaker, etc.) that performs output to other devices. The input device 15 and the output device 16 may be made integral as in the case, for example, of a touch screen. Each device, such as the processor 11 and the memory 12, is able to communicate information with each other via a bus 17. The bus 17 may constitute a single bus or more than one different buses for connection of different units of server 10.

Figure 3:
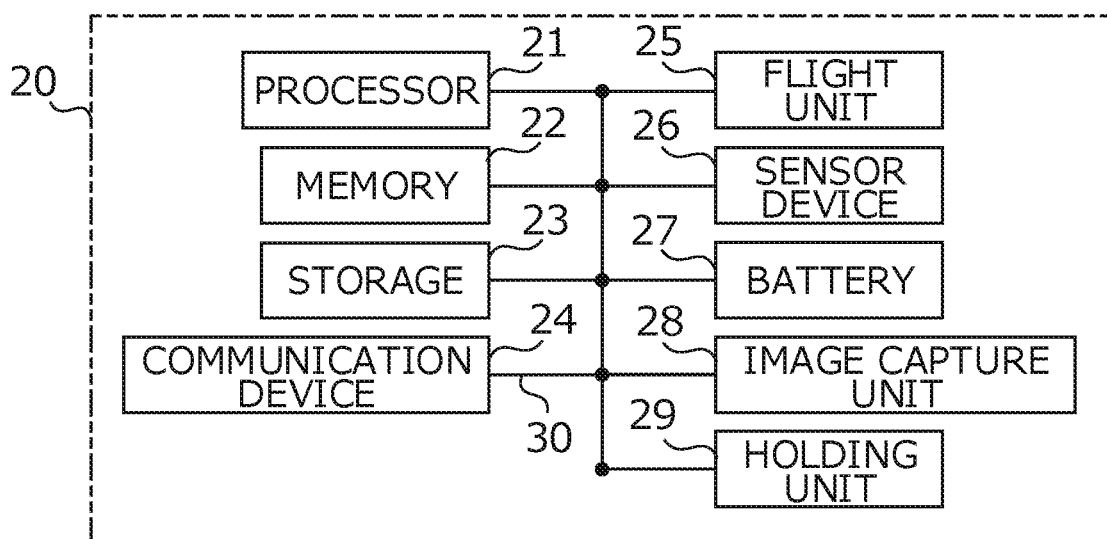
FIG. 3 is a diagram illustrating a hardware configuration of a drone, in accordance to the present invention.

FIG. 3 shows a hardware configuration of the drone 20. The drone 20 functions as a computer and includes a processor 21, a memory 22, a storage 23, a communication unit 24, a flight unit 25, a sensor device 26, a battery 27, an image capture unit 28, a holding unit 29 and a bus 30. Note that the term "apparatus" used herein can also be read to mean a circuit, a device, a unit, or the like. A plurality of devices described above may be included in the drone 20. Alternatively, some of the devices described above may be omitted.

Processor 21, memory 22, storage 23, communication unit 24, and bus 30 are hardware of the same type (although not necessarily of the same performance and specifications) as the device of the same name shown in FIG. 2. In addition to wireless communication with the network 2, the communication unit 24 can also perform wireless communication between drones 20. Flight apparatus 25 includes a rotor described above, and a driving means such as a motor for rotating the rotor to enable flight of the drone 20. The flight unit 25 may cause the drone 20 to fly in any direction or may cause the drone 20 to hover while airborne.

Sensor device 26 is a device for acquiring information necessary for flight control. The sensor device 26 includes a position sensor for measuring a position (latitude and longitude) of the drone 20, a direction sensor for measuring a direction in which the drone 20 is directed (i.e., a direction in which the front of the drone 20 is facing wherein the front and the back of the drone 20 are defined in advance), and an altitude sensor for measuring an altitude of the drone 20. Battery 27 is a device for storing power to be supplied to each unit of the drone 20. The battery 27 is an example of the "battery unit" of the present invention. Image capture unit 28 includes a lens and an image sensor or the like, which is used to capture an image of a surrounding area.

Holding unit 29 is a device for holding an item for transport by the drone 20. Various holding mechanisms can be used, such as a net, a string, an arm, a mount, or a box. In the present embodiment, an arm is employed. FIG. 4 shows an overview of the drone 20. The drone 20 is constituted of a chassis 31 having four landing legs 32, and a holding unit 29 having four arms 291 provided in the chassis 31.

Figure 4A:
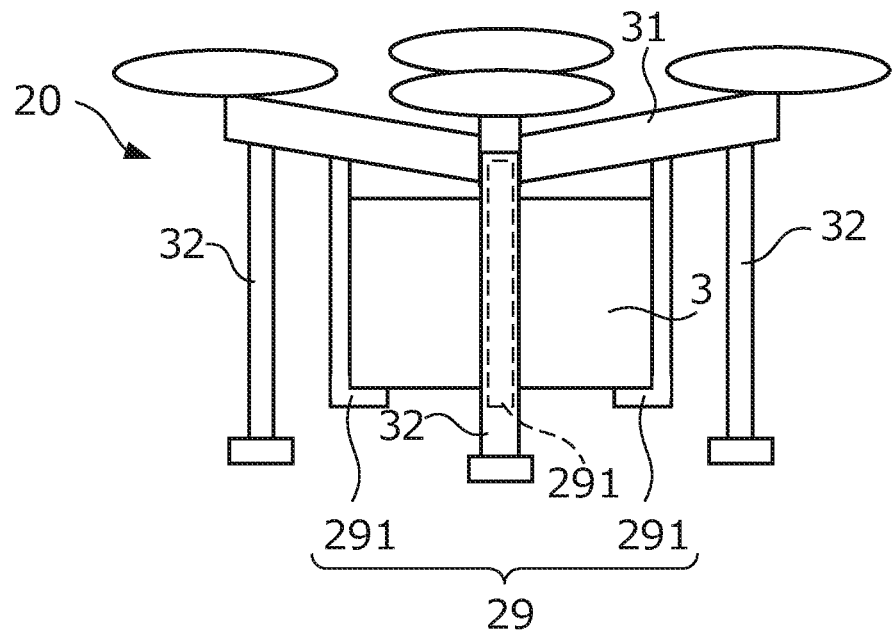
FIGS. 4A and 4B are diagrams illustrating an overview of the drone, in accordance to the present invention.
Figure 4B:
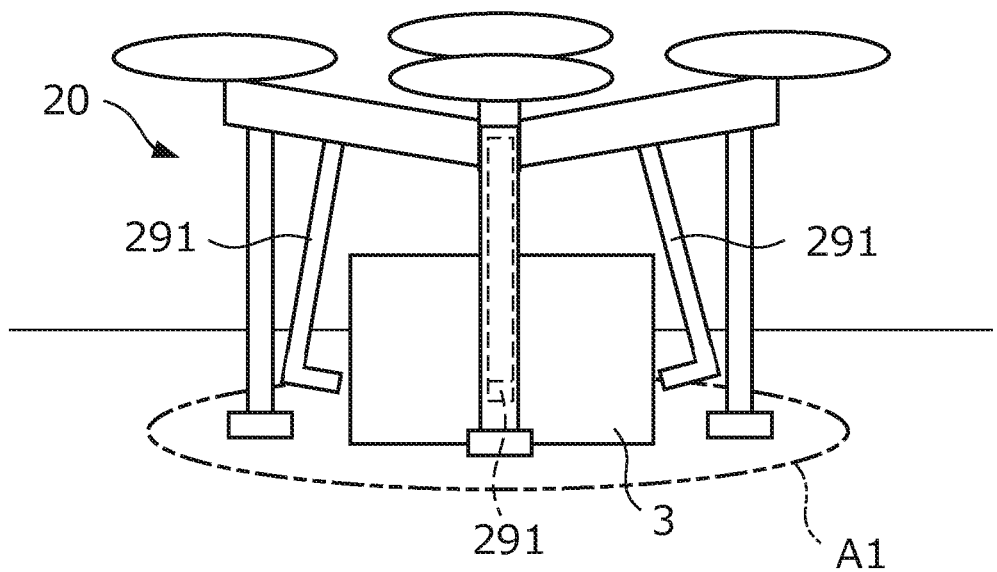

In FIG. 4A, the arms 291 as shown in a state holding the item 3, and are closed during flight of the drone 20. In FIG. 4B, the drone 20 is shown in a state of landing with the landing gear 32 in contact with the ground. The item 3 is released by opening the arms 291 while the drone 20 is in contact with the ground. The drone 20 lands at a place A1 (such as an entrance, a garden, a balcony, or a port provided at such places for landing and take-off of a drone) of the item provided at the destination to release the item 3. To prevent the released item 3 from being damaged due to impact if the item 3 were to be dropped, a length of the landing legs 32 is manually or automatically increased or decreased depending on a size of the item 3.

The server 10 and the drone 20 may include hardware such as a microprocessor, a digital signal processor (DSP), an Application Specific Integrated Circuit (ASIC), a Programmable Logic Device (PLD), and a Field Programmable Gate Array (FPGA), and some or all of the functional blocks may be realized by the hardware. For example, processor 11 may be implemented by use of at least one of the hardware.

Figures 5, 6:
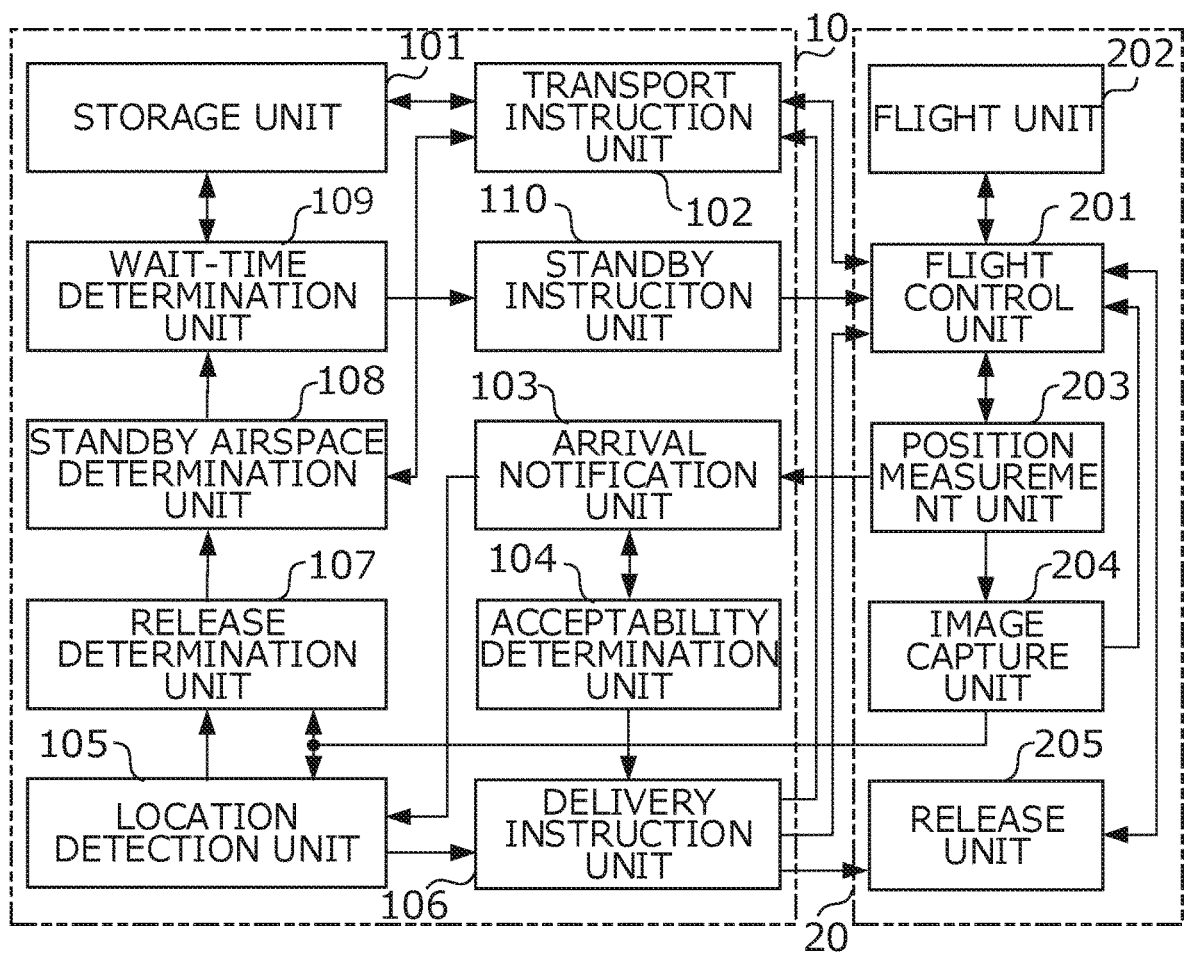
FIG. 5 is a diagram illustrating a functional configuration realized by the transport management system, in accordance to the present invention.
FIG. 6 is a diagram illustrating an example of a transport schedule, in accordance to the present invention.

The server 10 and the drone 20 included in the transport management system 1 store programs provided by the transport management system, and the processors of the apparatuses execute the programs to control the units, thereby realizing the functions described below. FIG. 5 shows a functional configuration realized by the transport management system 1. Although only a single drone 20 is shown in FIG. 5, it is assumed that a plurality of drones 20 each have the same functional configuration.

The server 10 includes a storage unit 101, a transport instruction unit 102, an arrival notification unit 103, an acceptability determination unit 104, a location detection unit 105, and a delivery instruction unit 106, a release determination unit 107, a standby airspace determination unit 108, a wait-time determination unit 109, and a standby instruction unit 110. The drone 20 includes a flight control unit 201, a flight unit 202, a position measurement unit 203, an image capture unit 204, and a release unit 205.

The flight control unit 201 of the drone 20 controls a flight of the drone 20. The flight control unit 201 controls the flight of the drone 20 from a destination to the distribution center, based on an instruction received from the server 10, as described later, to transport an item from the distribution center to the destination and return to the distribution center. The flight unit 202 provides a function for flying the drone 20. In this embodiment, the drone 20 flies under rotation of a rotor, a driving means, or the like provided in the flight unit 25.

The position measurement unit 203 measures the position of the drone 20, and supplies the position information indicating the measured position (e.g., latitude and longitude) to the flight control unit 201. Based on the supplied position information, the flight control unit 201 causes the aerial vehicle to fly to the destination, the distribution center, or other locations. The position measurement unit 203 also transmits the position information to the server 10. The server 10 supplies the transmitted positional information to the arrival notification unit 103, as will be described later.

The storage unit 101 of the server 10 stores a schedule for transportation of items. The schedule includes identification information (item ID (Identification)) of an item for transportation, identification information (drone ID) of the drone 20 used for transport, position information (an address, or latitude and longitude information) of the destination, an arrival time at the destination, and the like. The reception time designated by the user, or the scheduled delivery time transmitted to the user at the time of ordering the item, or the like may be used as the arrival time, for example.

FIG. 6 shows an example of the schedule. In the case of FIG. 6, the three transport IDs "H001," "H002," and "H003," the respective destination information, and the arrival times of "T1," "T2," and "T3" are associated with the drone ID "D001" for identification of the draw 20-1 shown in FIG. 1. In addition, three item IDs "H004," "H005," and "H006," the respective destination information, and the arrival times of "T4," "T5," and "T6" are associated with a drone ID "D002" for identification of the drone 20-2.

In the present embodiment, it is assumed that a single parcel is transported by a single flight. The schedule covers all transport to be made by the drone 20 in one day. The schedule is generated by a transportation company such that the drone 20 is able to transport a parcel to a destination, return to the distribution center, and transport another parcel to another destination within a predetermined time. Based on the schedule stored in the transport storage unit 101, the transport instruction unit 102 instructs the drone 20, which is scheduled to transport the item, in accordance with the schedule.

The transport instruction unit 102 calculates a length of time required for a transport from each destination information, preferably taking into account a predetermined time margin. A departure time for the drone 20 is calculated based on an arrival time by extracting a length of time required for the transport. When the departure time arrives, the transport instruction unit 102 transmits to the drone 20 instruction data indicating the destination information and the arrival time used to calculate the departure time, and an instruction to transport the item having the item ID associated with the destination information. The method of instructing the transport is not limited thereto; and the transport instruction unit 102 may instruct, for example, a flight route to the destination, a flight speed, a flight altitude, and the like.

The drone 20 supplies the received instruction data to the flight control unit 201. The flight control unit 201 initiates the flight to the destination based on the destination information indicated by the instruction data. When the drone 20 arrives at the destination, the position measurement unit 203 measures the position of the destination and transmits the position information indicative of the measured position to the server 10. The position information of the destination transmitted from the position measurement unit 203 to the server 10 is supplied to the arrival notification unit 103.

The arrival notification unit 103 notifies the recipient of the item that the drone 20 has arrived at the destination. The arrival notification unit 103 stores, for example, a destination that can be notified to the recipient in association with an item ID of the item. For example, an email address or Social Networking Service account may be used for the notification. The arrival notification unit 103 transmits notification data to the notification address indicating that the drone 20 has arrived at the destination. The notification data is displayed on a recipient's smartphone.

Figure 7:
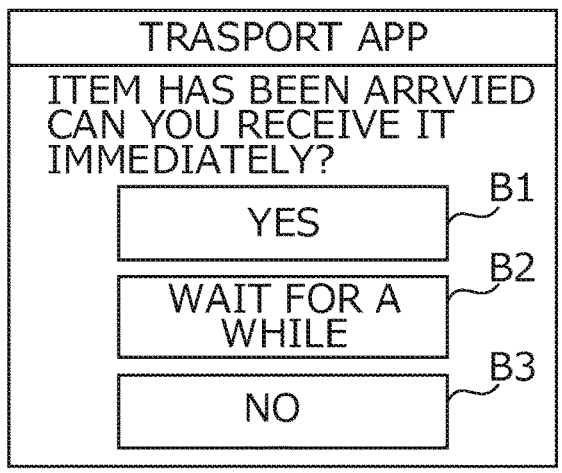
FIG. 7 is a diagram illustrating an example of the displayed notification data, in accordance to the present invention.

FIG. 7 shows an example of displayed notification data. In the example of FIG. 7, a transport application program for exchanging information on a transport is installed in a smartphone, and a screen for confirming reception is displayed by the transport application program. On the screen, the following information is displayed: a message "Item has arrived; can you receive it immediately?"; Button B1 for "Yes"; Button B2 for "Wait for a while"; and Button B3 for "No."

When the Yes button B1 is pressed, the smartphone transmits to the server 10 reply data indicating that immediate reception is possible. When the button B2 is pressed to indicate that it is possible to receive the item if the drone 20 waits for a while, the smartphone transmits reply data to the server 10 indicating that the reception should be delayed for a while. When the button B3 is pressed, the smartphone transmits reply data to the server 10 indicating that the drone should not wait.

The arrival notification unit 103 sends the information indicating the notification address to which the notification data has been transmitted to the acceptability determination unit 104. The acceptability determination unit 104 judges whether the item that has arrived at the destination can be received. When the reply data is transmitted from the notification address indicated by the supplied information, the acceptability determination unit 104 performs a determination based on the reply data. The acceptability determination unit 104 determines that the reply data can be received immediately if the reply data indicates that immediate reception is possible, and determines that the item cannot be received if the reply data indicates that it is not necessary to wait for reception If the reply data indicates that the recipient wishes to wait for a while for the reception, the acceptability determination unit 104 determines that there is a possibility that the item will be able to be received if the drone 20 waits. In addition, in the present embodiment if the reply data is not transmitted within a predetermined period of time, the acceptability determination unit 104 determines that if the drone 20 waits there is a possibility that the item will be able to be received, since a possibility of successful reception is not confirmed, which means that the item may be able to be received immediately or be able to be received after waiting for a short period of time.

In addition, the arrival notification unit 103 notifies the location detection unit 105 that the drone 20 has arrived at the destination. In this embodiment, it is assumed that a place used for a delivery of the item by the drone 20 is provided at a residence of the recipient who uses a delivery service of the drone 20. The places for delivery includes a place where the item is allowed to be delivered regardless of whether the recipient is present at the place, and a place where the item is to be delivered only if the recipient is present at the place.

Of these places, the former is a place that is always available (i.e., available in the absence of the recipient) even if the item is delivered to a place, such as a place provided in a garden surrounded by a wall or a place provided on a balcony on a second or higher floor, so that the item is not likely to be stolen. On the other hand, the latter place is a place that can be used only in the presence of the recipient, because the item is likely to be stolen if the item is delivered in that place, which includes, for example, a place in a garden that is readily accessible from outside.

Figure 8A:
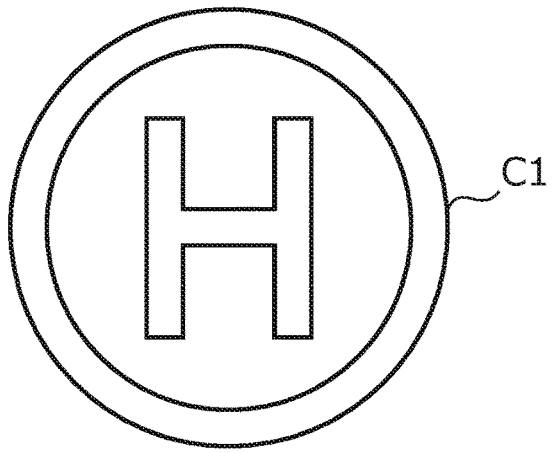
FIGS. 8A and 8B are diagrams illustrating examples of a mark, in accordance to the present invention.
Figure 8B:

It is assumed that a mark is provided at a place at which an item is to be delivered. FIG. 8 shows examples of marks. In FIG. 8, a mark "H" is surrounded by a circle, similar to a mark used in a heliport. FIG. 8A shows a mark C1 that indicates a place that is always available. FIG. 8B shows a mark C2 that indicates a place that is available only in the presence of the recipient. In this example, the mark C1 is represented by an upper case H encircled in white, and the mark C2 is represented by an uppercase H encircled in black.

The location detection unit 105 detects a location for delivery of an item transported by the drone 20 at the destination of the item. The location detection unit 105 performs the detection based on an image captured by the drone 20. When the position measurement unit 203 of the drone 20 measures a position of the destination, the position measurement unit 203 notifies the image capture unit 204. Upon receipt of this notification, the image capture unit 204 commences capture of the destination, which is typically a residence of the recipient of the item.

The image capture unit 204, captures an image over a wide angle to ensure that the image contains a mark. For example, the view angle covers all of a lower hemisphere area. The image capture unit 204 captures an image of the destination at a fixed time interval, transmits the image data of the captured image to the flight control unit 201, and to the server 10. The location detection unit 105 receives the image data transmitted by the image capture unit 204 of the drone 20, and recognizes a mark based on the received image data by using a pattern matching technique or the like.

When any one of the marks C1 and C2 is recognized based on the captured image, the location detection unit 105 determines that the place at which the mark is provided is the place to be used for delivery of the item. When the location detection unit 105 recognizes the mark C1, it determines that there is a location that is always available (i.e., available even if there is no recipient at that storage location) and, if it recognizes the mark C2, it determines that there is a storage location that is available only in the presence of the recipient.

The location detection unit 105 determines that there is no location for delivery of the item at the destination in a case where recognition of the mark based on the image failed. It is of note that the location detection unit 105 is an example of the "location detection unit" of the present invention. Upon detecting the location, the location detection unit 105 notifies the delivery instruction unit 106 whether the detected mark is the mark C1 or C2. When no location detected, the location detection unit 105 notifies the delivery instruction unit 106.

The acceptability determination unit 104 notifies a result of the determination to the delivery instruction unit 106, when it is determined that the item can be received immediately or when it is determined that there is a possibility that the item can be received if the drone 20 is caused to standby. The delivery instruction unit 106 issues an instruction (delivery-related instruction) to the drone 20. In this context, the delivery method includes not only releasing the item in a place where the recipient is present and delivering it to the recipient on the spot, but also releasing the item in the place where the recipient is not currently present for the recipient to receive the item later.

When the delivery instruction unit 106 is notified by the acceptability determination unit 104 that the item can be received immediately, it is determined that the item can be delivered when the location detection unit 105 notifies that a location detected. In this case, the location may be either a location indicated by the mark C1 or a location indicated by the C2, since it is confirmed that the recipient will be there.

The delivery instruction unit 106 also determines that delivery of the item is possible when the location detection unit 105 notifies that there is a location that can be used at all times. In this case, it is possible to release the item in the location regardless of whether the recipient is present. In either case, the delivery instruction unit 106 transmits instruction data instructing landing at the detected location and release of the item from the drone 20. It is of note that releasing the item means releasing the item from the drone 20. The item may be released on ground at a predetermined location, or may be released in air such that the item is dropped at the predetermined location.

The drone 20 supplies the transmitted instruction data to the flight control unit 201 and the separation unit 205. Upon receiving the instruction data, the flight control unit 201 causes the drone 20 to move to a position where the mark included in the image of the image data supplied by the image capturing unit 204 is located downward of the drone 20, and the drone to descend from that position, and land on the mark. When the drone 20 lands, the flight control unit 201 notifies the separation unit 205.

The release unit 205 releases the item as shown in FIG. 4. When instructed to release the item based on the instruction data transmitted by the server 10, the release unit 205 releases the item carried by the drone 20 under a landing notification notified by the flight control unit 201. When the item is released, the release unit 205 notifies the flight control unit 201 and the drone 20 commences return to the distribution center.

When the reception of the item is not possible, the delivery instruction unit 106 instructs the drone 20 to return to the distribution center without delivering the item. The transport instruction unit 106 determines that the delivery is not possible when it is notified by the reception permission determining unit 104 that the reception is not possible or when it is notified by the location detection unit 105 that the location is not found. Upon receiving the return instruction, the drone 20 commences return to the distribution center.

When it is determined that the reception is not possible, the acceptability determination unit 104 notifies the arrival notification unit 103. Upon receipt of the notification, the arrival notification unit 103 notifies the notification address of the recipient that the item is to be brought back by the drone 20. The transport instruction unit 106 notifies the transport instruction unit 102 a case in which the item is released and the drone 20 returns without the item and also in a case in which the drone 20 returns together with the item.

Upon arrival at the distribution center, the flight control unit 201 notifies the transport instruction unit 102. The transport instruction unit 102 instructs that another item be transported next by the drone 20 that has transmitted the return notice. With respect to the drone 20 that has finished all of the scheduled transports, if there is any item that has been carried back (namely, if a notification exists that the item has been returned together with the drone 20), the transport instruction unit 102 issues a transport-related instruction indicating re-distribution of the item.

In addition, the transport instruction unit 102 may issue a transport-related instruction indicating re-distribution of the item when there is an item that the other drone 20 has taken back, even if there is no item that the drone 20 that has completed the scheduled transportation.

Up to this point, delivery of the item to the recipient on the spot and return without delivery of the item have been described. There will now be described a case in which it is not possible to deliver an item immediately, but there is a possibility that the item can be delivered in a short period of time and the drone 20 waits at the destination. [0060]

When it is determined that there is a possibility of delivering the item by causing the drone 20 to wait at the destination, the acceptability determination unit 104 notifies the separation determination unit 107. In addition, the location detection unit 105 notifies the separation determination unit 107 upon detecting the mark C2 indicating a place available for delivery only in the presence of a recipient.

The release determination unit 107 determines whether the drone 20 carrying the item can release and deliver the item at the destination. It is of note that the release determination unit 107 is an example of "the determination unit" of the present invention. Here, determination means determining whether the recipient can receive the item and/or whether there is a place in which the item can be delivered in the absence of the recipient, assuming that the drone 20 has a function to release the item; and does not mean determining whether the drone 20 has a function of releasing and delivering the item.

The release determination unit 107 determines whether the item can be released and delivered in a case that the notification from the acceptability determination unit 104 is not received or in a case that the notification from the location detection unit 105 is not received. That is, the release determination unit 107 determines whether the item can be released and delivered for receipt of the item upon arrival at the destination, or determines that a place is detected where the item can always be delivered.

The release determination unit 107 determines that it is not possible to release and place the item when the notification from the acceptability determination unit 104 and the location detection unit 105 is received; in other words, it is detected that the item that has arrived at the destination will not be received and there is no place that is always available for receipt of the item at the destination. When the release determination unit 107 determines that is it not possible to release and deliver the item, it notifies the standby airspace determination unit 108 accordingly.

The standby airspace determination unit 108 determines an airspace for standby where the drone 20 waits when it receives this notification, that is, when it is determined that it is not possible to release and deliver the item. The standby airspace determination unit 108 enquires about the destination of the drone 20 at the transport instruction unit 102 and in response acquires the location information of the destination. The standby airspace determination unit 108 specifies a type of a building of the destination from the acquired destination information.

The standby airspace determination unit 108 stores in advance a list indicating, for example, location information of a condominium complex. If the acquired location information is included in the list, the type of building is determined as a condominium. If it is not included, the type of building is determined as a separate or detached house. The standby airspace determination unit 108 determines, as the standby airspace, an airspace above a roof that is separated by a predetermined distance (about 5 to 10 m), for example, if the type of building is a detached house.

If the type of building of the destination is a condominium, the standby airspace determination unit 108 determines the standby airspace according to the height of the building. The standby airspace determination unit 108 determines that the standby airspace is above a roof or the roof of the building as long as the drone 20 follows a flight-altitude regulation. When waiting on the roof of the building or above the roof, the standby airspace determination unit 108 does not follow the flight-altitude for the drone 20, the standby airspace determination unit 108 determines a space above eaves or plants of an entrance or the like of the building as a standby airspace, if such a space exists.

As described above, the standby airspace determination unit 108 determines the airspace above a place where a person is not normally present in the transported building of the standby airspace. The information on the height of the condominium, the heel portion, the tree, or the like may be included. When such information is not included, the standby airspace determination unit 108 may receive the image data transmitted by the image capture unit 204 of the drone 20 and determine the standby airspace based on the image data of the destination.

For example, when the drone 20 recognizes the roof of the building based on the image before reaching the upper altitude limit, the standby airspace determination unit 108 determines the roof as the standby airspace. When the drone 20 during flight recognizes the roof as being equal to or higher than the upper altitude limit, the standby airspace determination unit 108 detects eaves or plants based on the image, and determines a space above the detected object as the standby airspace. In either case, the standby airspace determination unit 108 determines the space based on the destination as the standby airspace. The standby airspace is an example of the "predetermined airspace" of the present invention.

After determining the standby airspace, the standby airspace determination unit 108 notifies the wait-time determination unit 109 of the determined standby airspace. The wait-time determination unit 109 determines a length of time for the drone 20 to wait in the standby airspace. The wait-time determination unit 109 determines the wait-time when the standby airspace is notified; that is, when it is detected that the item upon arrival at the destination will not be received by the recipient, or that no place exists at the destination that is available for delivery at all times, similarly to the standby airspace determining unit 108. The wait-time determination unit 109 is an example of the "determination unit" of the present invention.

In the present embodiment, the wait-time determination unit 109 determines the wait-time based on the schedule of the drone 20. The wait-time determination unit 109 reads the schedule of the drone 20 from the storage unit 101, and determines an arrival time of the item to be transported next by the drone 20. The wait-time determination unit 109 calculates a length of time required for returning to the distribution center from the current location, carrying an item for next transportation, and arriving at the next destination. The wait-time determination unit 109 stores the performance (in particular, a flight speed) of each drone 20 and an average length of time required for carrying an item.

The wait-time determination unit 109, for example, calculates a time required for transportation of an item by dividing a distance from the current position to the next destination of the distribution center by a flight speed of the drone 20 and adding the average time of carrying the item. The wait-time determination unit 109 further calculates a delivery time required for flying from the standby airspace to a destination place for release of the item and preparation for return. For example, the higher the altitude of the standby airspace is, the longer the delivery time is.

When, for example, the recipient presses the Yes button B1 shown in FIG. 7 on the transport application program immediately before the wait-time ends, the acceptability determination unit 104 determines that the item can be received immediately, and delivery of the item starts. In this case, if both the time required for delivery and the time required for transportation elapse, it is not possible to arrive at the next destination if the sum of the time required for delivery and the time required for transportation elapse; in other words, if the drone 20 departs at a time calculated by subtracting the sum of the time required for delivery and the time required for current transportation from an arrival time of the next transportation. The wait-time determination unit 109 calculates the time described above and determines the length of time from the current time to the calculated time as the wait-time.

As described above, in the present embodiment the wait-time determination unit 109 determines, as the wait-time, a time period in which even if the drone 20 departs after the standby, the drone 20 can arrive at the next destination by the arrival time for the next destination. In some cases, it is not possible to reserve the wait-time depending on the arrival time for the next destination. In such cases, the wait-time determination unit 109 may determine 0 hours; this means that the wait is not reserved as the wait-time. The wait-time determination unit 109 notifies the standby instruction unit 110 of the determined wait-time together with the standby airspace notified by the standby airspace determination unit 108.

The standby instruction unit 110 issues an instruction related to waiting (hereafter, referred to as a wait-related instruction) to the drone 20. The standby instruction unit 110 transmits instruction data to the drone 20 to wait for the instructed length of time in the standby airspace. The drone 20 transmits the instruction data to the flight control unit 201. The flight control unit 201 causes the drone 20 to fly to the standby airspace indicated by the instruction data, and to wait while hovering until the instructed wait-time length indicated by the instruction data elapses.

If the recipient presses the button B1 in the transporting application program when the drone 20 is on standby, the drone 20 delivers the item and returns as described above. If the Yes button B1 is not pressed when the drone 20 is on standby, the drone 20 returns with the item, and transports the next item. In each of these cases, since the wait-time is determined as described above, the drone 20 is able to transport the next item by a scheduled arrival time.

Figure 9:
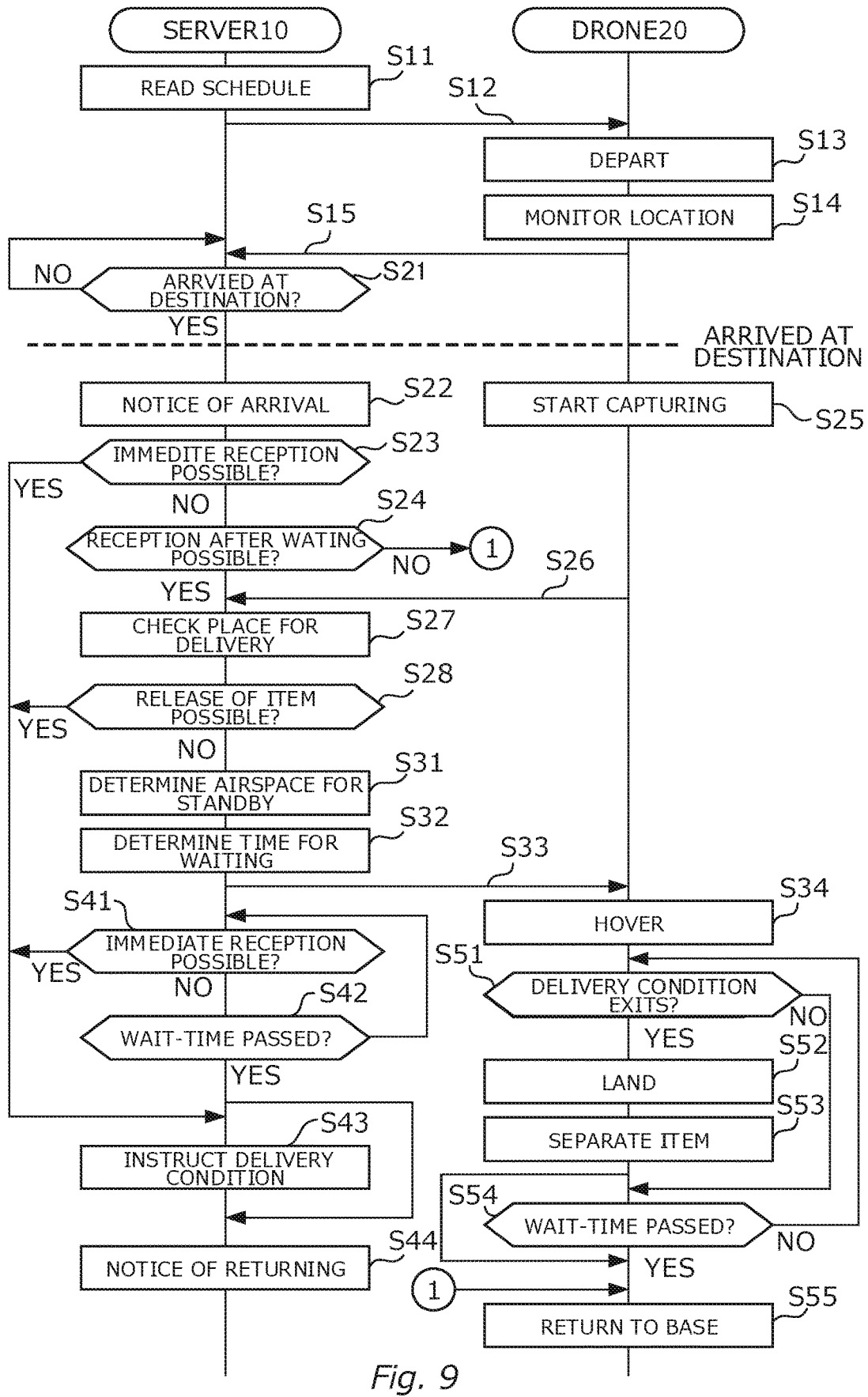
FIG. 9 is a diagram illustrating an example of the operation procedure of each device in the transport management process, in accordance to the present invention.

Devices included in the transport management system 1 perform a process of managing transportation of the item using the drone 20 based on the above-described configuration. FIG. 9 shows an example of a procedure for the devices included in the transport management process. For example, the procedure starts when a time (a business hour of the transportation company or the like) at which a transportation operation by the drone 20 starts.

First, the server 10 (transport instruction unit 102) reads the schedule stored in the server 10 (step S11), and transmits instruction data (data indicating the destination information and the arrival time) instructing a transport to the drone 20 (step S12). Next, the drone 20 (the flight control unit 201 and the flight unit 202) commences the flight to the instructed destination (step S13).

Next, the drone 20 (position measurement unit 203) starts to measure a position of the drone 20 (step S14), and transmits to the server 10 position information indicative of the position measured each time the measurement of the is performed (step S15). The server 10 (arrival notification unit 103) determines whether the drone 20 has arrived at the destination based on the transmitted position information (Step S21). The operation at Step S21 is repeated until it is determined that the drone 20 has arrived at the destination (YES).

When the server 10 (arrival notification unit 103) confirms the arrival of the drone 20 at step S21 (YES), the server 10 notifies a recipient that the drone 20 has arrived at the destination at step S22. Next, the server 10 (acceptability determination unit 104) determines whether the item can be received immediately based on whether a reply is received from a notification address and a content of the reply (step S23).

In a case that immediate reception is not possible (NO), the server 10 (acceptability determination unit 104) determines whether reception is possible after a short period of time (step S24). On the other hand, when the drone 20 (the image capture unit 204) arrives at the destination, the drone 20 starts to capture an image (Step S25). The captured image of the destination is transmitted to the server 10 (Step S26). When it is determined that the reception is possible (YES) after waiting for a short period of time, at step S24, the server 10 (location detection unit 105) detects, based on the captured image, a location for releasing the item, which is provided at the destination based on the captured image (step S27).

Next, the server 10 (release determination unit 107) determines whether the drone 20 can release the item and deliver the item at the destination (step S28). When it is determined at step S28 that the reception is not possible (NO), the server 10 (standby airspace determination unit 108) determines the standby airspace of the drone 20 (step S31). Subsequently, the server 10 (wait-time determination unit 109) determines a wait-time for the drone 20 (step S32). Next, the server 10 (the standby instruction unit 110) transmits instruction data instructing the drone 20 to wait for the wait-time in the standby airspace (step S33).

The drone 20 (the flight control unit 201 and the flight unit 202) waits by hovering in the standby airspace indicated by the instruction data (step S34). After the instruction data is transmitted at step S33, the server 10 (acceptability determination unit 104) determines whether the item can be received immediately (step S41). When it is determined that an immediate reception is not possible (NO), the server 10 (transport instruction unit 106) determines whether the wait-time determined at step S32 has elapsed (step S42).

If it is determined at step S42 that the wait-time has lapsed (NO), the server 10 returns to step S41 and repeats the processes of steps S41 and S42 until it is determined at step S41 that the reception is immediately possible (YES), or until it is determined at step S42 that the time has elapsed (YES). When it is determined that an immediate reception is possible (YES), the server 10 (delivery instruction unit 106) issues a delivery-related instruction to deliver the item to the recipient (step S43).

The server 10 performs the operation at step S43 (delivery-related instruction) when it is determined that the item can be received immediately (YES) at step S23, or when it is determined that the item can be released and delivered, at step S28 (YES). The drone 20 that is waiting at step S34 determines whether there is a delivery-related instruction (step S51). If it is determined that there is no wait-time (NO), it is determined whether a wait-time has elapsed (step S54).

The drone 20 repeats the operations of steps S51 and S54 until it is determined that there is a delivery-related instruction (YES) or until it is determined that the wait-time has elapsed (YES). When it is determined that there is a delivery-related instruction (YES), the drone 20 (the flight control unit 201 and the flight unit 202) lands at the place provided at the destination (Step S52). Next, the drone 20 (release unit 205) releases the item from the drone 20 (Step S53), and the drone 20 (the flight control unit 201 and the flight unit 202) then return to the distribution center (step S55).

Drone 20 (flight control unit 201 and the flight unit 202) also performs the operation at step S55 when it is determined that the wait-time has elapsed (YES) at step S54. Further, in a case that reception is not possible (NO) even after waiting for a while, at Step S24, the server 10 (delivery instruction unit 106) instructs the drone 20 to return. In such a case, the operation at step S55 is also performed. When it is determined at step S42 that the wait-time has elapsed (YES), the server 10 (the arrival notification unit 103) notifies the recipient of the return of the drone 20 with the item (step S44).

In the present embodiment, as described above, in a case that a recipient cannot immediately receive the item, and there is no location that is always available for receipt of the item, if it is determined that the recipient will be able to receive the item after waiting for a while, the delivery of the item is performed during the wait-time when the recipient is ready to receive the item. As a result, it is possible to reduce a number of returned items transported by the drone 20 as compared to a case in which the drone 20 does not wait. In addition, since the drone 20 returns to the base and flies to the next destination after the wait-time has elapsed, an influence on other transport is reduced as compared to a case in which the wait-time is not used and the drone may thus wait indefinitely.

2. Modifications

The embodiment described above is an example of the embodiment of the present invention and may be modified as follows.

[2-1] Alternative Transportation

In the embodiment, a time for arrival at a next destination is determined as a wait-time length. However, the wait-time length may be increased by substituting another drone 20 for the scheduled next transport.

In the present modification, the standby airspace determination unit 108 notifies the transport instruction unit 102 that a standby airspace has been determined. The transport instruction unit 102 determines whether there is a drone 20 available for transport of the next item for which the standby airspace has been determined. For example, if it is determined that there is a drone 20 that has completed all of its scheduled transport, the transport instruction unit 102 determines that there is a drone 20 available for transport of the next item.

The transport instruction unit 102 may also determine that there is a drone 20 available for transport of the next item if, for example, there is a spare empty drone 20 that is not scheduled for transport, or if there is a drone 20 that is available for a sufficient length of time in which to transport the next item. If it is determined that such a drone 20 exists, the transport instruction unit 102 provides to the substitute drone 20 a transport-related instruction for delivery of the next item.

The transport instruction unit 102 notifies the wait-time determination unit 109 of a transport-related instruction for the next item. Upon receipt of the notification, the wait-time determination unit 109 determines that the transport of the next item for delivery to the next destination can be made by the substitute drone 20, and determines a time at which the drone 20 will arrive at the next destination as the arrival time for the next destination, except for the substitute drone 20 one that is substituted even if departure has taken place after standby, as the wait-time length.

Figure 10A:
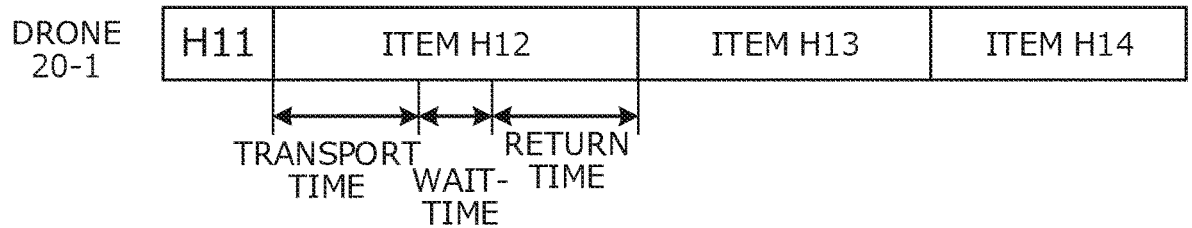
FIGS. 10A and 10B are diagrams illustrating examples of a wait-time according to a modification of the present invention.
Figure 10B:
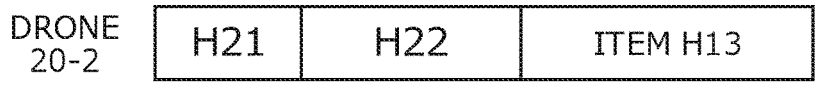
Figure 10B:
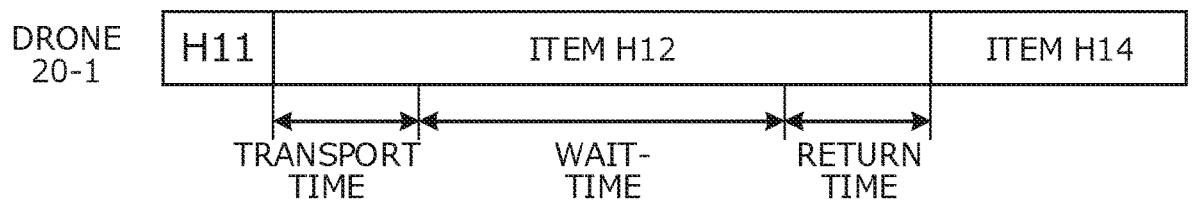

FIG. 10 shows an example of a wait-time length of this modification. In FIG. 10A, the estimated time required for transporting the items H11, H12, H13, and H14 to be transported by the drone 20-1 is indicated. The transport time to the destination, the determined wait-time length, and the return time for the item H12 are shown. The wait-time length in this case is determined to be a time at which the return can be performed by the time at which the transport of the next item H13 is started even if the delivery is performed at the end of the wait-time length.

FIG. 10B shows the wait-time length when the drone 20-2 can replace the transport of the item H13. Since only the transport for the item H21 and H22 is scheduled and the item H13 can be transported by the arrival time of the drone 20-2, the transport instruction unit 102 instructs the drone 20-2 to transport the item H13. In this case, the wait-time determination unit 109 determines a time period in which the return can be performed by the time for start of the transport of the next transport H14, except for the transport H13 in which the item is put, as the wait-time length period of the drone 20-1.

The transport may be substituted for two or more items. For example, when the drone 20-1 is scheduled to transport the item H15 after the item H14, two transports for the items H13 and H14 are substituted. In this case, the wait-time determination unit 109 determines a time period within which the return can be performed based on the time for start of the transport for the item H15, except for the items H13 and H14 for which the transportation is input as the wait-time length period for the drone 20-1.

As described above, the wait-time determination unit 109 determines a scheduled time at which the drone 20 will arrive at the next destination, excluding the alternative destination, even if the drone 20 departs after standby, assuming that a schedule set for waiting drone 20 to be used for transport to more than one of the destinations is rescheduled for substitution by another drone 20. As a result, the wait-time length can be increased as compared with a case in which transport replacement is not performed, and thus instances of failure to deliver and return of an item can be reduced.

[2-2] Residual Power

The wait-time length may be determined so that the drone 20 initiates a return trip to a recharge station (e.g., the distribution center) where battery 27 can be recharged.

Figure 11:
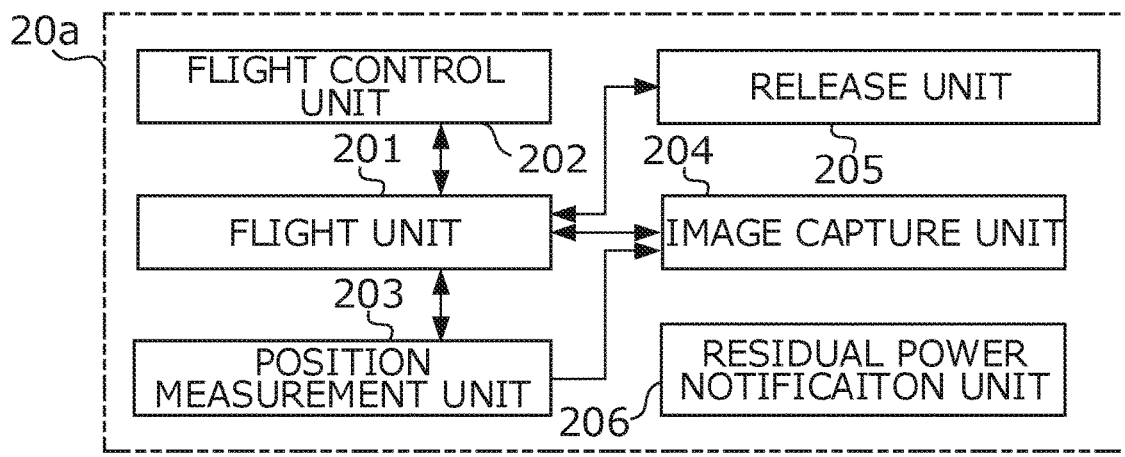
FIG. 11 is a diagram illustrating the functional configuration of a drone according to the modification of the present invention.

FIG. 11 shows a functional configuration of the drone 20a of the present modification. Drone 20a includes a residual power notification unit 206 in addition to the units shown in FIG. 11.

The residual power notification unit 206 measures an amount of power remaining in the battery 27, and notifies the server 10 at predetermined time intervals of the amount of measured power remaining. Upon receiving the notification of the amount of remaining power, the wait-time determination unit 109 calculates a distance for which the drone 20a can continue to fly with the notified remaining power. The calculation method may be, for example, a method of calculating a flight distance based on a value obtained by multiplying a coefficient verified in advance to the power remaining amount, or by use of a table including amounts of power and possible flight distances.

When the charging station is a distribution center, the wait-time determination unit 109 determines a possible flight distance relative to the notified remaining power amount, and where the difference between the flight distance from the destination of the drone 20a to the distribution center is less than a predetermined threshold value, it is determined that the wait-time length has ended. The difference corresponds to an amount of surplus power to be secured to ensure return of the drone 20a. In other words, the wait-time determination unit 109 determines, as the wait-time length of the drone 20a, the time until the remaining power amount falls below an amount that is sufficient for flight return to the location for charging the battery 27, even if the drone 20a departs after waiting.

In the present modification, the standby airspace determination unit 108 notifies the standby instruction unit 110 of the determined standby airspace. The standby instruction unit 110 instructs the drone 20a to start standby in the determined standby airspace. Upon receipt of the instruction, the drone 20a starts hovering in the instructed standby airspace. When it is determined that the wait-time length has ended, the waiting time determination unit 109 notifies the standby instruction unit 110.

Upon receiving the notification, the standby instruction unit 110 instructs the drone 20a to end the waiting and start the return. The drone 20a starts the return to the distribution center in response to the instruction. The wait-time determination unit 109 calculates in advance a time when the subtracted value from the alteration in the remaining power amount is less than the threshold value; the time may be determined as a wait-time length. In a case that the remaining power amount is less than that required for the drone 20a to fly to the charging station for recharge of the battery 27, the drone 20 departs after a determination of a wait-time.

By determination of the wait-time length as described above, as compared with the case in which the wait-time length is determined regardless of the remaining power amount, it is possible to prevent occurrence of an incident in which the drone 20 cannot return due to power shortage. If it is possible to charge at the destination, the wait-time length may be determined to be longer. Recharging is possible, for example, when the battery 27 is provided with a wireless recharging function, and a charger for wireless recharging is installed at a delivery destination of the next item.

In addition, even when the battery is charged by wire, if the battery is delivered to the recipient, the battery can be charged by insertion by the recipient of a charge plug into the drone 20a. In either case, the recipient may provide a facility for charging the drone 20a in advance and perform charging. The charging may be free of charge, a charge may be incurred later, or the charge may be settled as a part of the transportation service fee.

The wait-time determination unit 109 determines the time for which the power remains (the time that remains for flight of the drone 20a to the charging location for the battery 27, even if the drone 20a departs after standby) when the remaining power amount is greater than that at the start of standby as the wait-time length due to charging of the battery 27 at the destination. In other words, the wait-time determination unit 109 determines a longer time as the wait-time length as compared with a case in which the battery 27 cannot be recharged.

When wireless recharging is possible, the wait-time determination unit 109 determines a wait-time length taking into account in advance the recharging. The wait-time determination unit 109 in addition to the time required for transportation and the time required for delivery of the next item, for example, calculates a time required for recharging the power from an empty state, such that the drone can fly to the next destination and a next return.

The wait-time determination unit 109 calculates a time retroactively based on the total transport time, the delivery time, and the charge time from the arrival time of the next item, and determines the time from the current time to the calculated time as the wait-time length. This is because, if hovering is complete at this time, even if the transfer and the charging are performed, the next transport can be made in time and return to the distribution center can be made.

When recharging is possible only when a recipient is present, the wait-time determination unit 109 determines a wait-time length based on charging when the recipient indicates that the recipient intends to receive delivery during standby, since return without charging is not possible. The recipient displays their intention by using, for example, the transport application shown in FIG. 7.

Figure 12:
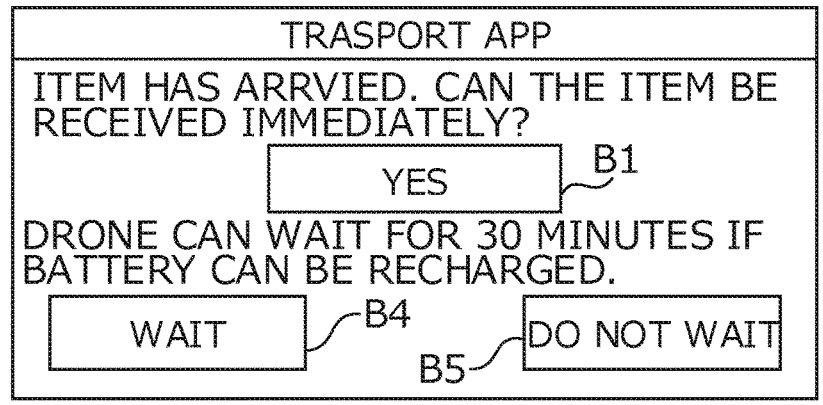
FIG. 12 is a diagram illustrating an example of notification data according to the modification of the present invention.

FIG. 12 shows an example of the notification data displayed in this modification.

In the example shown in FIG. 12, in addition to the character string and the Yes button B1 shown in FIG. 7, a character string indicating "can wait for 30 minutes if the drone can be charged," a button B4 that displays "Wait," and a button B5 that displays "Do not wait" are shown. When the button B4 is pressed, the recipient's smartphone transmits to the server 10 reply data indicating an intention to await reception for charging; and when the button B5 is pressed response data is received indicating the intention to wait for charging.

If the reply data indicates an intention to wait for reception for charging, the acceptability determination unit 104 determines that the reception and charging are to be performed while waiting for the drone 20a. When this determination is made, the wait-time determination unit 109 determines that the recipient has indicated an intention to receive while waiting, and determines a wait-time length based on charging. As described above, since the wait-time length is determined in consideration of the charging at the destination, the wait-time length can be increased compared to a case in which charging is not considered, return of an item can be reduced.

It is of note that the determination as to whether the battery 27 can be charged at the destination may be performed by another method. For example, when information indicating that it is possible to charge the drone in a mark (such as a character string indicating "chargeable") is included, the wait-time determination unit 109 determines whether charging is to be performed based on capture of an image of the mark. In addition, in a case where the recipient has registered in advance information indicating whether charging is permitted, the wait-time determination unit 109 may determine whether charging is permitted by referring to the information.

Further, the battery unit for storing power for supply to each part of the drone is not limited to a rechargeable secondary battery, and the battery may be, for example, a non-rechargeable primary battery. In such a case, if the primary battery is replaced, the power of the battery unit is replenished. The distribution center is an example of a place where the primary battery can be replaced, i.e., the battery unit of the present invention can be recharged. Further, the primary battery and the secondary battery may be used in combination. In either case, if it is possible to replenish/recharge the power of the primary/secondary battery unit at the destination, the wait-time determination unit 109 determines the remaining power time as the wait-time length when the battery power is greater than that at the initiation of the standby as described above.

[2-3] Weather

The wait-time length may be determined based on the weather in the area where the drone 20 flies.

Figures 13, 14, 15:
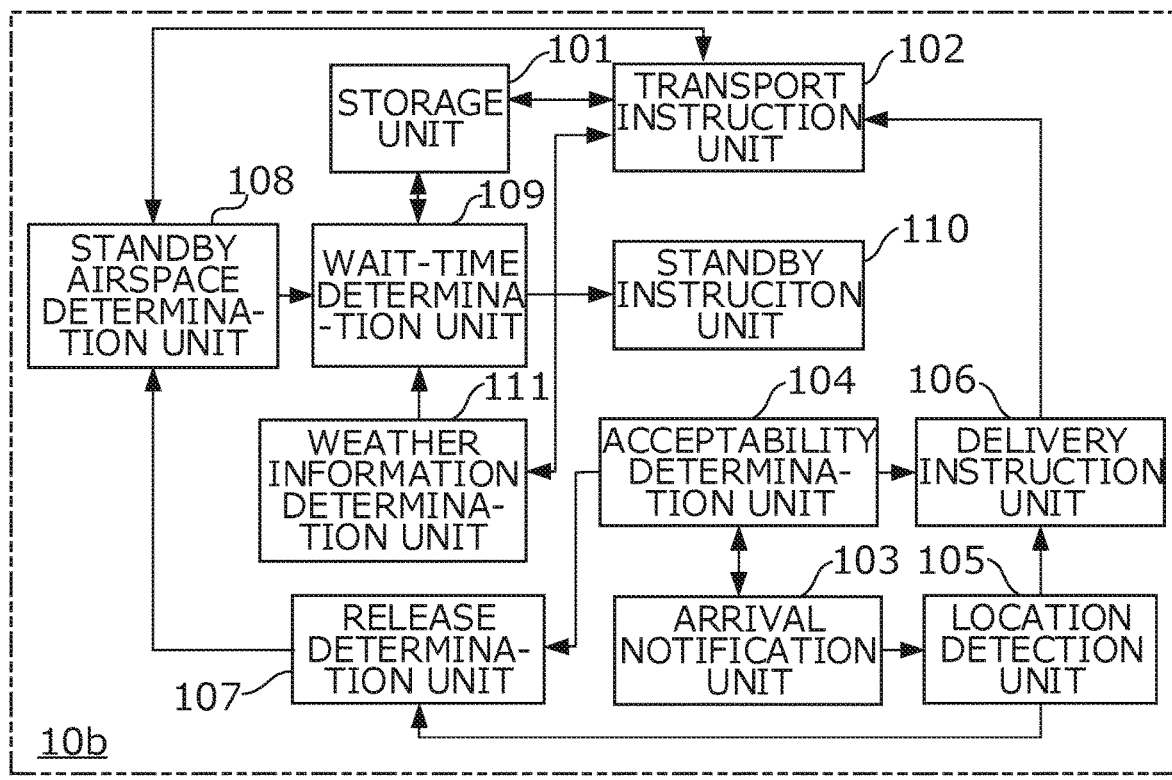
FIG. 13 is a diagram showing the functional configuration of a server according to the modification of the present invention.
FIG. 14 is a diagram illustrating an example of a schedule according to the modification of the present invention.
FIG. 15 is a diagram illustrating an example of an upper limit table, in accordance to the present invention.

FIG. 13 shows a functional configuration of the server 10b according to the present modification. The server 10b includes a weather information acquisition unit 111 in addition to the units illustrated in FIG. 5.

The weather information acquisition unit 111 acquires information on weather in an area where the drone 20 flies. The weather information acquisition unit 111 is an example of the "weather information acquisition unit" of the present invention. The weather-related information is information indicating weather elements such as wind direction, wind strength, rainfall, snowfall amount, temperature, humidity, and the like, as well as weather such as sunny, cloudy, rain, snow, and the like, and times or time zones for forecast of such weather variants and weather. The weather information acquisition unit 111 acquires the position information of the destination from the transport instruction unit 102, and acquires the weather forecast of the area including the position indicated by the acquired position information and the distribution center as the weather-related information described above.

The weather information acquisition unit 111 supplies the acquired weather-related information to the wait-time determination unit 109. When the time at which the specific weather is obtained is indicated by the acquired weather information, the wait-time determination unit 109 determines as the wait-time length a time at which the drone 20 can return even if the drone 20 departs after the standby. The specific weather is a weather condition under which it becomes difficult for the drone 20 to fly as scheduled, for example, during rain or snow.

In addition, the weather in which a combination of one or more meteorological events, such as precipitation above a threshold, snowfall above a threshold, and wind velocity above a threshold, results in a specific condition being set as the specific weather. The wait-time determination unit 109 calculates a time retroactively by the required time for delivery and the required time for transportation from a time at which the specific weather occurs, and determines as the wait-time length a time from the current time to the calculated time. Thus, even when the drone 20 departs after a wait, it is possible for the drone 20 to return to the distribution center before a specific weather (e.g., difficult flight weather) occurs.

The weather information is not limited to weather forecasts. For example, the drone 20 may include a wind speed sensor, a rain sensor, a snow sensor, or the like, and the weather information acquisition unit 111 may acquire the present weather or weather elements measured by those sensors as the weather information. In this case, the wait-time determination unit 109 determines that the wait-time length has passed when the weather or weather element indicated by the acquired information is included in a specific area, i.e., an area where the weather will deteriorate.

If a distance from the destination to the distribution center is short, even if the drone 20 starts to return at a time when the determined wait-time length ends, the drone 20 can return to the distribution center before the weather drastically deteriorates (before the weather becomes the above-mentioned specific weather). In determining the wait-time length, the wait-time determination unit 109 may use the information on the weather forecast if the distance between the destination and the distribution center is equal to or greater than the threshold value. If the distance is less than the threshold value, information measured by the sensor may be used.

[2-4] Attributes of Transportation

The wait-time length may be determined based on attributes of transported items. An attribute relates to characteristics of transportation, and is an indicator of how a condition (quality, etc.) of the item depends on delivery conditions. The delivery conditions include, for example, outside air temperature and vibration during transportation.

In the present modification, the storage unit 101 stores a transportation schedule, which includes attributes of items.

FIG. 14 shows an example of transported items of this modification. In the example shown in FIG. 14, as an attribute of each item shown in FIG. 6, a recommended temperature category during delivery, namely normal temperature, refrigeration, or freezing, is represented.

For example, an attribute "frozen" is set for items having item IDs "H003" and "H006," "cold" for an item having an item ID "H004," and "normal temperature" for the other items. These attributes may indicate that a condition of an item may deteriorate during transport. Items whose attributes are "frozen" or "cold" are stored in a refrigerator or freezer at a distribution center. However, in general, it is difficult to provide sufficient cooling or freezing of the container accommodating the item to be mounted on the drone 20. This means that the longer the transportation time is, the higher the temperature inside the container becomes.

In the present modification, with respect to items (fresh food, ice cream, etc.) having attributes of refrigeration and freezing, the upper limit of the time required for transport (refrigeration is the upper limit LT1 and freezing is the upper limit LT2) is determined by, for example, a transportation company. It is presumed that if the transportation is performed for a time longer than the upper limit, a possibility that the quality of the item will not be maintained increases. Therefore, in a case where the upper limit of the time required for transport is indicated by the attribute of an item, the wait-time determination unit 109 of the present modification determines, as the wait-time length, the time in which transport of the item is completed before elapse of the upper limit of the time required for departure of the drone 20 after waiting.

The wait-time determination unit 109 stores an upper limit table in which each attribute is associated with the upper limit of the time required for transport described above.

FIG. 15 shows an example of a table with upper limits of transport time. In FIG. 15, the upper limits of the transport times of "none," "LT1" and "LT2" are associated with the attributes of items of "normal temperature," "cold" and "frozen."

The wait-time determination unit 109 refers to an attribute of the item transported by the drone 20 from the schedule which is read from the storage unit 101, and refers to the upper limit of the required time associated with the referred attribute in the upper limit table. The wait-time determination unit 109 calculates a time when the upper limit required time referred to from the time when the drone 20 departs from the distribution center has elapsed. This time represents a time at which the drone 20 must return to the distribution center in order to maintain a condition of the item.

The wait-time determination unit 109 calculates a time retroactively from the calculated time by the time required for delivery and the time required for transportation, and determines a length of time from the current time to the calculated time as the wait-time length. By making a return after the wait-time length determined in this way has elapsed, the drone 20 can arrive at the distribution center before the upper limit of the time required for transportation has elapsed so as to store the returned item in the refrigerator or freezer before the condition of the item deteriorates.

The wait-time determination unit 109 may change the upper limit of the time required for transportation depending on environmental factors such as the air temperature. Specifically, the wait-time determination unit 109 determines the wait-time length based on the upper limit of the required time for the transport that becomes shorter as the air temperature becomes higher. Information may be acquired by the weather information acquisition unit 111 shown in FIG. 13, for example. Thus, it is possible to reduce an incident in which a condition of the item deteriorates on a day when the air temperature is high as compared with a case where the upper limit remains constant.

[2-5] Lifestyle Patterns

The wait-time length may be determined based on a lifestyle pattern of a recipient.

Figure 16:
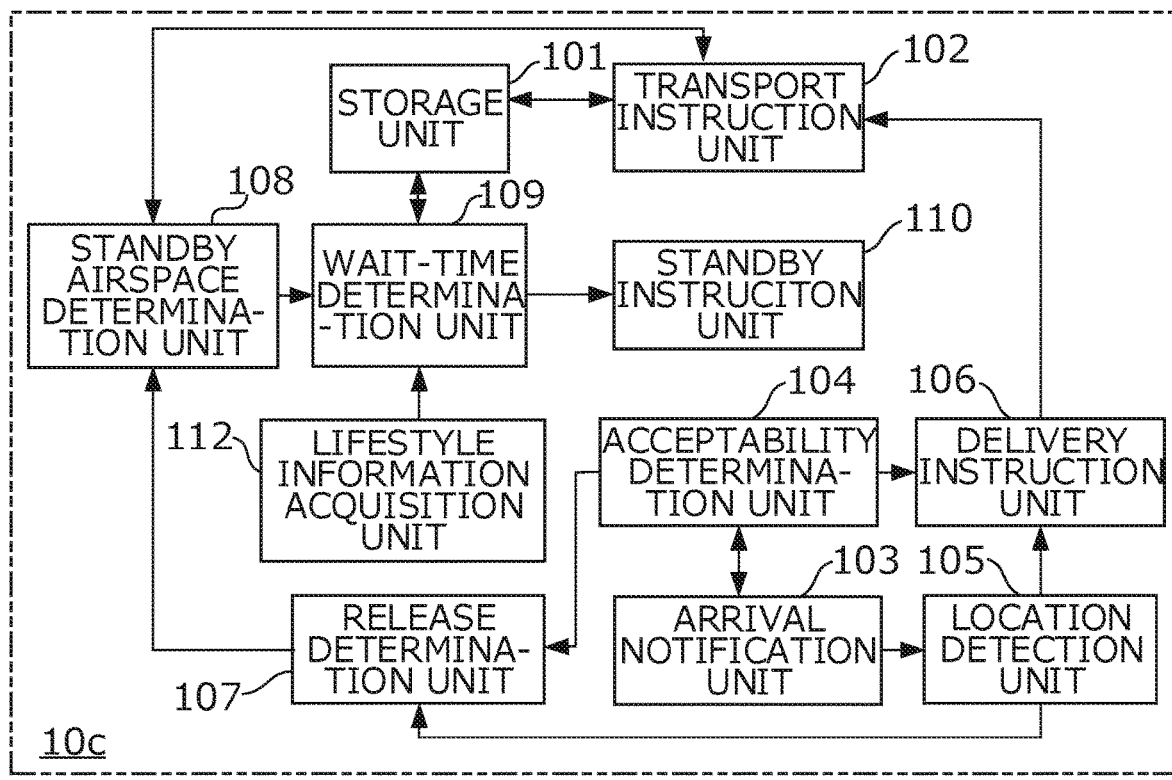
FIG. 16 is a diagram illustrating the functional configuration of a server according to the modification, in accordance to the present invention.

FIG. 16 shows a functional configuration of the server 10c according to the present modification. The server 10c includes a lifestyle information acquisition unit 112 in addition to the units shown in FIG. 5.

The lifestyle information acquisition unit 112 acquires information representative of the lifestyle pattern of the recipient of the carrier (hereafter, "lifestyle information"). The lifestyle information acquisition unit 112 is an example of the "pattern acquisition unit" of the present invention. The lifestyle information is, for example, schedule information of the recipient. If the schedule information includes working hours, a time of ending business hours, or a time of arriving home, etc., a time at which the recipient returns home to receive the item can be determined.

In addition, the position information obtained by measuring the position of the recipient (the position information of the smartphone) and a time at which the measurement is performed may be used as the lifestyle information. If a location of the recipient's home is known, a time at which the recipient returns to the location would represent a time at which the item is receivable. In the present modification, the smartphone carried by the recipient periodically transmits schedule information, position information, or the like as lifestyle information to the server 10c by the above-described transport application. The lifestyle information acquisition unit 112 acquires the lifestyle information transmitted in this way.

The lifestyle information acquisition unit 112 supplies the acquired lifestyle information to the wait-time determination unit 109. The wait-time determination unit 109 determines a wait-time length that is equal to or longer than a length of time from the current time to a time at which the recipient will be ready to receive the item, and which is represented by the lifestyle information acquired by the lifestyle information acquisition unit 112. For example, when the current time is 17:20 and the lifestyle information indicates a schedule for returning home at 17:30, the wait-time determination unit 109 determines a wait-time length of 10 minutes or more.

In this case, the wait-time determination unit 109 may determine as the wait-time length a time of 10 minutes, which is same as the time up to the time when the reception becomes possible, or may determine as the wait-time length a time obtained by adding a margin to the time (e.g., 10 minutes*1.5=15 minutes). In either case, it is possible to reduce a case in which the wait-time length expires before the recipient is ready to receive, as compared with the case where the wait-time length is determined without considering the lifestyle information.

The wait-time determination unit 109 may determine the wait-time length when the time from the current time to the time when the recipient represented by the lifestyle information acquired by the lifestyle information acquisition unit 112 becomes ready to receive the item is equal to or less than the threshold value. As the threshold value, for example, a time (30 minutes, for example) uniformly determined by the transportation company as the longest wait-time length may be used; or the above-described time in which the transport to the next destination is in time may be used. In either case, it is possible to prevent indefinite waiting even if the time at which the reception becomes possible is known.

As the lifestyle information, information indicating a schedule of a family member other than the recipient of the item (the person to whom the item is addressed) may be used if the family member is present. However, in a case that a family member is a child, the user (child) is deemed inappropriate as a recipient, due to a possibility of being victim to crime, and therefore, the acceptability determination unit 104 may determine that it is not possible for the item to be received upon arrival at the destination. In addition, the time at which the recipient arrives at the house is not necessarily same as the time at which the recipient becomes ready to receive. For example, if the recipient's working hours include nighttime (i.e., night shift work), it may not be possible to receive in the morning at which time the recipient arrives home, but it may be possible to receive in the evening after sleep during the day.

[2-6] Place for Landing and Waiting

In the embodiment, the drone 20 necessarily hovers while waiting, but the drone may land and wait.

Figure 17:
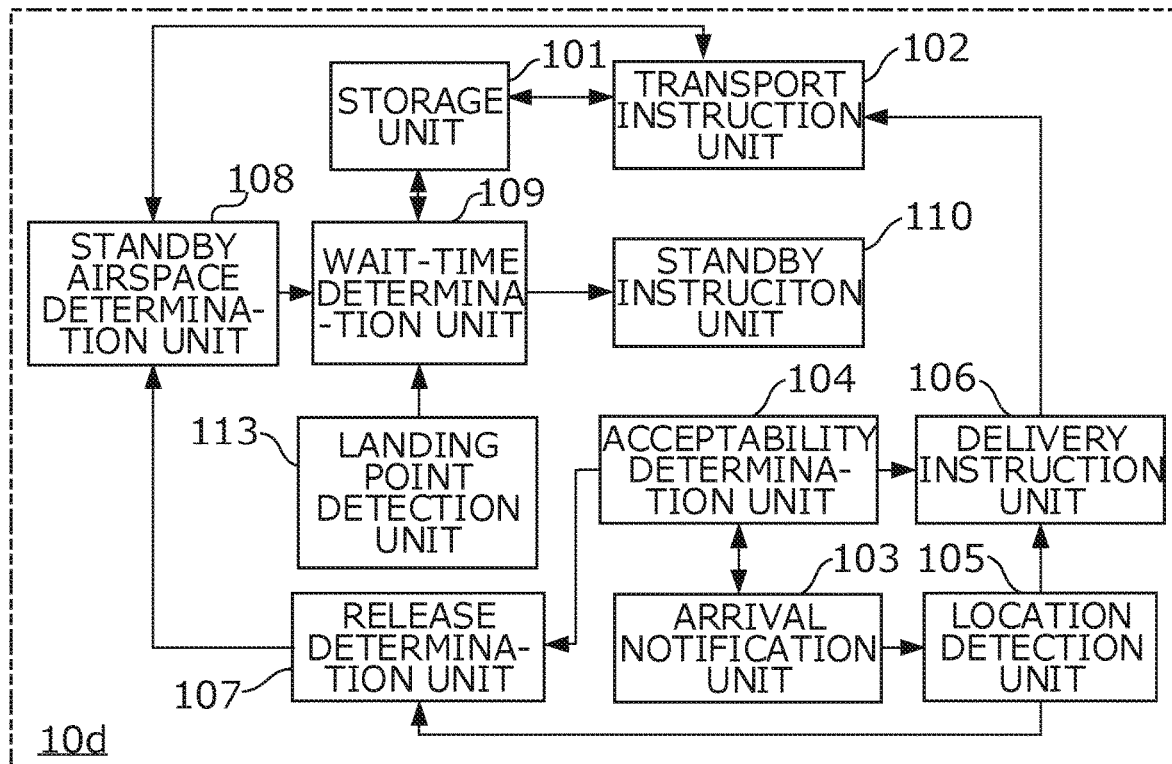
FIG. 17 is a diagram illustrating the functional configuration of a server according to the modification of the present invention.

FIG. 17 shows a functional configuration of the server 10*d* according to the present modification. The server 10*d* includes a landing location detection unit 113 in addition to the corresponding units shown in FIG. 5.

In this modification, the landing point detection unit 113 detects a standby place where the drone 20 can land and wait. The landing location detection unit 113 is an example of the "location detection unit" of the present invention. The standby place on which the drone 20 can land and wait is, for example, a horizontal and flat roof, or a roof in the case of a single house, or a balcony having a width that accommodates entry of the drone 20, or a roof determined as a restricted area in the case of a condominium. The landing location detection unit 113 determines whether the destination is a stand-alone house or a condominium, for example, similarly to the standby airspace determination unit 108.

The landing point detecting unit 113 determines, for example, whether the roof is horizontal and flat, or has a roof based on a captured image when it is specified as a stand-alone family house, and detects the roof or the roof as a standby place when it is determined that this is the case. Further, the landing location detection unit 113, when identified to be the condominium, for example, stores the spacing information or the like of the condominium in advance, determines whether it has the above-described balcony or roof, and if the determination is affirmative, detects the balcony or the roof as a standby place.

When the landing location detection unit 113 detects the standby location, it supplies the standby location information (roof, location information on the roof, or information on the orientation and height of the balcony, etc.) indicating the detected standby location to the wait-time determination unit 109. In the present modification, when the standby location information is supplied, the wait-time determination unit 109 determines the wait-time length at the standby location indicated by the standby location information even if the standby airspace is notified.

More specifically, when the drone 20 lands and a standby place for waiting is detected, the wait-time determination unit 109 determines a longer time as the wait-time length than when a standby place is not detected. For example, when determining 10 minutes as the wait-time length for waiting in the notified standby airspace if the standby place is not detected, the wait-time determination unit 109 determines 20 minutes as the wait-time length if the standby wait place is detected.

When the drone 20 lands to wait, since it is possible to reduce power consumption as compared with waiting by hovering, it is possible to prevent the occurrence of a situation in which the drone 20 cannot return due to a power shortage despite waiting for a longer time. In addition, by determining a longer wait-time length as compared with the case of waiting by hovering, it is possible to reduce a case of returning the drone 20 together with the item.

[2-7] Detection of the Location of Delivery

The location detection unit 105 may determine whether there is a place for delivery by a method different from that of the embodiment. For example, when information indicating a place registered in advance for each destination is stored in the device, the location detection unit 105 may determine whether there is a place for delivery by reading the information (if the information is registered it is determined that the place exists, and if the information is not registered it is determined that the place does not exist).

Figure 18:
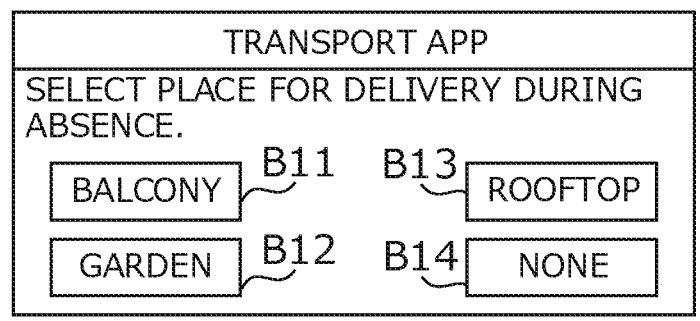
FIG. 18 is a diagram illustrating an example of notification data according to the modification of the present invention.

Further, for example, the presence or absence of a place may be confirmed by an arrival notification by the arrival notification unit 103. FIG. 18 shows an example of the notification data displayed in this modification. In the example of FIG. 18, a character string "SELECT PLACE FOR DEKLIVERY DURING ABSENCE" and buttons B11, B12, B13, and B14 indicating "Balcony," "Garden," "Rooftop" and "None" are displayed on the screen of the transport application of the recipient's smartphone.

When the reply data indicating that one of the buttons B11 to B13 has been pressed is transmitted, the location detection unit 105 determines that the place indicated by the pressed buttons is the place at which an item should be placed. When the reply data indicating that the button B14 has been pressed is transmitted, the location detection unit 105 determines that there is no place for delivery. As described above, the determination of the place may be performed in advance or may be based on information obtained from the recipient during transportation of the item.

[2-8] how to Determine Whether to Receive

The acceptance determining unit 104 may determine acceptance by a method different from that of the embodiment. For example, when a person is recognized based on the image of the destination captured by the image capture unit 204 of the drone 20, the acceptability determination unit 104 may determine that the person can receive immediately. In this case, although in the embodiment the imaging unit 204 captures a wide-angle image, the angle of view may be narrowed so as to capture only the destination residence. This makes it possible to determine that the recipient is ready to receive without need to notify the recipient if the recipient is present on the balcony or in the garden and thus is obviously ready to receive.

[2-9] Judgment Method of Delivery

Delivery instruction unit 106 may determine whether to deliver an item in a manner different from the embodiment. When the location detection unit 105 determines that there is a place that can be used at all times, the transport instruction unit 106 determines whether to deliver the item based on a vacant space within the place and on information on the size of the item.

In this modification, the image capture unit 204 of the drone 20 captures the detected always available location. The transport instruction unit 106 calculates the size of the item that can be delivered in the place from the captured image of the place. The place of the present modification is, for example, a table or a box, and a mark is provided on the top surface of the table or on the bottom surface of the box. It is assumed that the mark is, for example, predetermined in size or includes size information such as a numerical value representing a diameter of a circle surrounding the "H" character.

The delivery instruction unit 106 calculates the size of the top surface of the table or the bottom surface of the box as the size of the place on the basis of the ratio with the size of the mark (if each surface is a rectangular, the length of the long side and the short side is calculated). For example, when the size information (height×, width×depth) of the item is included in the schedule, the delivery instruction unit 106 reads the size information, and determines whether the size falls within the size of the calculated place for delivery. When it is determined that the delivery instruction unit 106 falls within the size of the storage location, it determines that delivery of the transported item is possible and issues delivery-related instructions.

When another item is already present in the place, the delivery instruction unit 106 calculates the size of the empty space within the place from the captured image (if the empty space is a rectangular or formed by aligning rectangles, the length of the long side and the short side of the rectangle(s) is calculated). In this case also, the delivery instruction unit 106 determines whether the item can be accommodated based on the calculated size of the place.

As the information used for calculating the location at which an item is delivered and the size of other items that are already present at the same location, for example, a radar using millimeter waves or the like may be provided in the drone in addition to using the photographic image, and the distance information between the drone and the object indicated as a result of the radar may be used. According to the present modification, it is possible to prevent a situation whereby damage is caused to the item by forcibly delivering the item despite lack of a vacant space for delivery in the above-described constantly available place.

[2-10] Method of Transporting an Item

The drone 20 transports the item to one destination in a single flight in the embodiment, but may transport the item to two or more destinations in a single flight. In this case, as the holding unit 29, a device is used that is capable of releasing a carried item in stages or selectively. For example, a device constituted of a storage device for storing a plurality of items in different storage rooms, each of which rooms can be locked.

In a case of transporting a plurality of items, the wait-time determination unit 109 may calculate a length of time for flying directly to a next destination from the current position, instead of calculating a length of time inclusive of time periods for returning to the distribution center from the present position, described in the embodiment as the wait-time length, and calculating the time period from carrying the next item to arrival at the next destination. Thus, as compared with the case in which the drone 20 transports the item to a single destination in a single flight, a number of cases of returning to the distribution center can be reduced, and the number of items that can be transported in a predetermined time can be increased.

[2-11] Aerial Vehicle

In the embodiment, a rotorcraft type aerial vehicle is used as an aerial vehicle for performing autonomous flight, but the present invention is not limited thereto. For example, the vehicle may be an airplane or a helicopter. Also, an autonomous flight function is not necessary. For example, a radio-controlled aerial vehicle operated by an operator from a distant place may be employed, and the aerial vehicle permitted to fly within a predetermined flight airspace within a predetermined time period.

[2-12] Devices for Realizing the Respective Functions

Devices for realizing the respective functions shown in FIG. 5 and the like may be different from those shown in these figures. For example, the drone may be provided with all or a part of the functions of the server (e.g., the drone may determine whether it is possible to receive or may determine the standby airspace and the wait-time length). In this case, the drone is an example of the "information processing apparatus" of the present invention. In addition, the operation performed by each function may be performed by another function (for example, the operation performed by the arrival notification unit 103 may be performed by the acceptability determination unit 104).

In addition, a function for performing these operations may be newly provided, for example, a function for generating notification data transmitted by the arrival notification unit 103 may be newly provided. In addition, two or more apparatuses may realize the respective functions of the server (for example, apparatuses having the storage unit 101 and the transport instruction unit 102 in the carrier may realize the functions). In short, if these functions have been realized as an integral transport management system, the transport management system may include several devices.

[2-13] Category of the Invention

The present invention can also be regarded as an information processing system such as an information processing apparatus referred to as a server, an aerial vehicle referred to as a drone, and a transport management system that includes these apparatuses and the aerial vehicle. In addition, the present invention can be regarded as an information processing method for realizing processing performed by each device, and as a program for causing a computer to control each device. The program may be provided in the form of a recording medium such as an optical disk in which the program is stored, or may be provided in the form of downloading to a computer via a network such as the Internet and installing and making available the program.

[2-14] Processing Procedures, Etc.

The processing procedures, sequences, flowcharts, and the like of the embodiments described in this specification may be rearranged as long as they do not conflict with each other. For example, the methods described herein are presented with elements of various steps in a sample order, and are not limited to the specific order presented.

[2-15] Handling of Input and Output Information, Etc.

The input/output information and the like may be stored in a specific location, for example, a memory, or may be managed by a management table. The input/output information and the like may be overwritten, updated, or additionally written. The output information or the like may be deleted. The input information or the like may be transmitted to another device.

[2-16] Software

Software should be widely interpreted to refer to instructions, instruction sets, code, segment code, program code, subprograms, software modules, applications, software packages, routines, subroutines, objects, executable files, executable threads, procedures, functions, and the like, in line with whatever is referred to as software, firmware, middleware, microcode, or hardware in description language.

Further, software, instructions, or the like may be transmitted and received via a transmission medium. For example, if the software is transmitted from a website, server, or other remote source using wired technologies such as coaxial cables, fiber optic cables, twisted pairs, and digital subscriber lines (DSL) and/or wireless technologies such as infrared, radio, and microwave, these wired and/or wireless technologies are included within the definition of transmission medium.

[2-17] Information and Signals

Information, signals, etc. described herein may be represented using any of a variety of different technologies. For example, data, instructions, commands, information, signals, bits, symbols, chips, or the like that may be referenced throughout the above description may be represented by voltages, currents, electromagnetic waves, magnetic fields or particle, optical fields or photons, or any combination thereof.

[2-18] Systems and Networks

As used herein, the terms "system" and "network" are used interchangeably.

[2-19] the Term "Based On"

As used herein, the phrase "based on" does not mean "based only on" unless otherwise specified. In other words, the phrase "based on" means both "based solely on" and "based at least on."

[2-20] the Terms "And" and "Or"

In the present specification, with respect to a configuration that can be implemented by "A and B" or "A or B," a configuration described in one expression may be used as a configuration described in the other expression. For example, when "A and B" are described, they may be used as "A or B" if they are not inconsistent with other descriptions and are feasible.

[2-21] Variations, Etc.

The embodiments described in this specification may be used alone, in combination, or switched according to execution. The notification of predetermined information (e.g., "X" notification) is not limited to explicit notification, and may be performed implicitly (e.g., by not performing notification of the predetermined information).

While the present invention has been described in detail, it will be apparent to those skilled in the art that the present invention is not limited to the embodiments described herein. The present invention may be implemented by modifications or in variations without departing from the spirit and scope of the invention as defined by the appended claims. Accordingly, the description herein is for purposes of illustration and description, and is not intended to be limiting of the present invention in any way.

REFERENCE SIGNS LIST

1. The transport management system
10. Server
20. Drone
101. Storage unit
102. Transport instruction unit
103. Arrival notification unit
104. Acceptability determination unit
105. Location detection unit
106. Delivery instruction unit
107. Release determination unit
108. Standby airspace determination unit
109. Wait-time determination unit
110. Standby instruction unit
111. Weather information acquisition unit
112. Lifestyle information acquisition unit
113. Landing point detection unit
201. Flight control unit
202. Flight unit
203. Position measurement unit
204. Image capture unit
205. Release unit
206. Residual power notification unit

What is claimed is:

1. An information processing apparatus comprising:
a judging unit configured to determine whether an aerial vehicle transporting an item can release the item at a delivery destination; and
a determination unit configured to determine a wait-time length for the aerial vehicle within a predetermined airspace at the delivery destination when it is determined that the aerial vehicle is not able to release the item at the delivery destination, wherein the wait-time length is based on at least one of a schedule of flight, an attribute of the item transported by the aerial vehicle, a remaining battery level, weather, a schedule of a recipient and whether there is a wait place that the aerial vehicle can land.

2. The information processing apparatus of claim 1, wherein the determination unit determines the wait-time length such that the aerial vehicle can arrive at a next delivery destination for delivering another item by an arrival time set for the next delivery destination.

3. The information processing apparatus of claim 2, wherein in a case when the aerial vehicle is scheduled originally to transport an item to each of a plurality of respective delivery destinations and when an alternative aerial vehicle is scheduled subsequently to transport for the aerial vehicle at least one of the items originally scheduled for delivery by the aerial vehicle, the determination unit determines a wait-time length of the aerial vehicle for delivery of the item scheduled to be delivered prior to the delivery by the alternative aerial vehicle based on an arrival time for the delivery of a next item for delivery by the aerial vehicle after the delivery by the alternative aerial vehicle.

4. The information processing apparatus according to claim 1, wherein:
the aerial vehicle includes a battery for power storage; and
the determination unit determines that a remaining amount of power stored in the battery is insufficient for the aerial vehicle to complete the wait-time length and following departure fly to a location for recharge of the battery.

5. The information processing apparatus according to claim 4, wherein the determining unit determines the wait-time length taking into account an amount of power recharge at the delivery destination.

6. The information processing apparatus according to claim 1, wherein the aerial vehicle includes a weather acquisition unit configured to acquire information on weather in an area where the aerial vehicle flies, and upon forecast of a predetermined weather event by the weather acquisition unit the determination unit determines the wait-time length after completion of which the aerial vehicle is able to return.

7. The information processing apparatus according to claim 1, wherein when an upper limit of a transport time is provided in correspondence with an attribute of the item carried by the aerial vehicle, the determination unit determines the wait-time length for completion of transport of the item and departure of the aerial vehicle prior to elapse of the upper limit of the transport time.

8. The information processing apparatus according to claim 1, further comprising a lifestyle information acquisition unit configured to acquire schedule information representative of a lifestyle pattern of a recipient of the item, wherein the determination unit determines the wait-time length based on the lifestyle pattern of the recipient that is equal to or less than a threshold value during which the recipient can receive the item.

9. The information processing apparatus according to claim 1, further comprising a lifestyle information acquisition unit configured to acquire schedule information representative of a lifestyle pattern of a resident living with a recipient of the item, wherein the determination unit determines the wait-time length based on the lifestyle pattern of the resident that is equal to or less than a threshold value during which the resident can receive the item.

10. The information processing apparatus according to claim 1, further comprising a location detection unit configured to detect a wait location at which the aerial vehicle can land and wait, wherein upon detection of the wait location, the determination unit determines a wait-time length that is longer than that when a wait location is not detected.

\* \* \* \* \*